United States Patent
Goh et al.

(10) Patent No.: US 11,571,617 B2
(45) Date of Patent: Feb. 7, 2023

(54) SYSTEM AND METHOD FOR COORDINATING GAMING HAPTIC RESPONSE ACROSS PERIPHERAL DEVICE ECOSYSTEM

(71) Applicant: Dell Products, LP, Round Rock, TX (US)

(72) Inventors: Peng Lip Goh, Singapore (SG); Rex W. Bryan, Round Rock, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 11 days.

(21) Appl. No.: 17/127,503

(22) Filed: Dec. 18, 2020

(65) Prior Publication Data

US 2022/0193538 A1 Jun. 23, 2022

(51) Int. Cl.
| | |
|---|---|
| A63F 13/285 | (2014.01) |
| G06F 3/01 | (2006.01) |
| G06F 3/04815 | (2022.01) |
| G06F 3/0354 | (2013.01) |
| H04R 1/10 | (2006.01) |
| G06F 3/02 | (2006.01) |
| G06V 40/20 | (2022.01) |

(52) U.S. Cl.
CPC ............ *A63F 13/285* (2014.09); *G06F 3/016* (2013.01); *G06F 3/0219* (2013.01); *G06F 3/03543* (2013.01); *G06F 3/04815* (2013.01); *G06V 40/20* (2022.01); *H04R 1/1008* (2013.01); *H04R 1/1041* (2013.01); *G06V 2201/02* (2022.01)

(58) Field of Classification Search
CPC .... G06F 3/016; G06F 3/0219; G06F 3/03543; G06F 3/04815
See application file for complete search history.

(56) References Cited

U.S. PATENT DOCUMENTS

| | | |
|---|---|---|
| 7,127,087 B2 | 10/2006 | Huang |
| 7,548,232 B2 | 6/2009 | Shahoian |
| 8,390,594 B2 | 3/2013 | Modarres |
| 8,466,859 B1 | 6/2013 | Herz |

(Continued)

*Primary Examiner* — Omkar A Deodhar
*Assistant Examiner* — Shauna-Kay Hall
(74) *Attorney, Agent, or Firm* — Prol Intellectual Property Law, PLLC; H. Kenneth Prol

(57) ABSTRACT

A haptic peripheral device ecosystem coordination system may comprise a display device displaying a three-dimensional (3D) gaming environment, the processor identifying a gaming action event occurring in the 3D gaming environment, based on a detected action event indicator, and determining a position of the gaming action event relative to a player avatar image within the 3D gaming environment, the processor transmitting a haptic command to a controller for a triggered haptic peripheral device, the haptic command selected based on an identification of the gaming action event, the triggered haptic peripheral device selected from a plurality of peripheral devices based on the position of the gaming action event, the controller for the triggered haptic peripheral causing haptic feedback at the triggered haptic peripheral device at a position relative to the user that is correlated to the position of the gaming action event with respect to the player avatar image.

20 Claims, 10 Drawing Sheets

(56) References Cited

U.S. PATENT DOCUMENTS

| | | |
|---|---|---|
| 9,448,631 B2 | 9/2016 | Winter |
| 9,636,574 B2 | 5/2017 | Casparian |
| 10,667,022 B2* | 5/2020 | Lacroix ............... H04N 21/435 |
| 2009/0079690 A1* | 3/2009 | Watson .................. A63F 13/10 |
| | | 345/161 |
| 2011/0216060 A1* | 9/2011 | Weising ................... G06T 7/20 |
| | | 345/419 |
| 2013/0038603 A1* | 2/2013 | Bae ...................... A63F 13/285 |
| | | 345/204 |
| 2014/0073409 A1* | 3/2014 | Lesley ................... G07F 17/34 |
| | | 463/25 |
| 2015/0268722 A1* | 9/2015 | Wang .................... A63F 13/843 |
| | | 345/156 |
| 2015/0355711 A1* | 12/2015 | Rihn ................... G06F 3/04815 |
| | | 340/407.2 |
| 2016/0202760 A1* | 7/2016 | Churikov ............. G06F 3/0416 |
| | | 345/173 |
| 2017/0102766 A1* | 4/2017 | Hayashida .............. G06F 3/147 |
| 2017/0203207 A1* | 7/2017 | Lacroix .................. G06F 3/016 |
| 2018/0143688 A1* | 5/2018 | Rihn ..................... G08B 21/182 |
| 2018/0161671 A1* | 6/2018 | Heubel ................... A63F 13/25 |
| 2019/0041986 A1* | 2/2019 | Rihn ....................... G06F 3/016 |
| 2019/0046886 A1* | 2/2019 | George ................. A63F 13/211 |
| 2019/0366210 A1* | 12/2019 | Beltran .................. A63F 13/86 |

\* cited by examiner

SYSTEM AND METHOD FOR COORDINATING GAMING HAPTIC RESPONSE ACROSS PERIPHERAL DEVICE ECOSYSTEM

FIELD OF THE DISCLOSURE

The present disclosure generally relates to an ecosystem of peripheral devices for an information handling system, such as a keyboard, mouse, display device, and audio headset, for example. The present disclosure more specifically relates to coordinated generation of thermo-haptic feedback at one or more piezoelectric actuators within such a peripheral device ecosystem, based on images of gameplay displayed at the display device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard or other input or output devices such as cursor control devices for manual input of information by the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
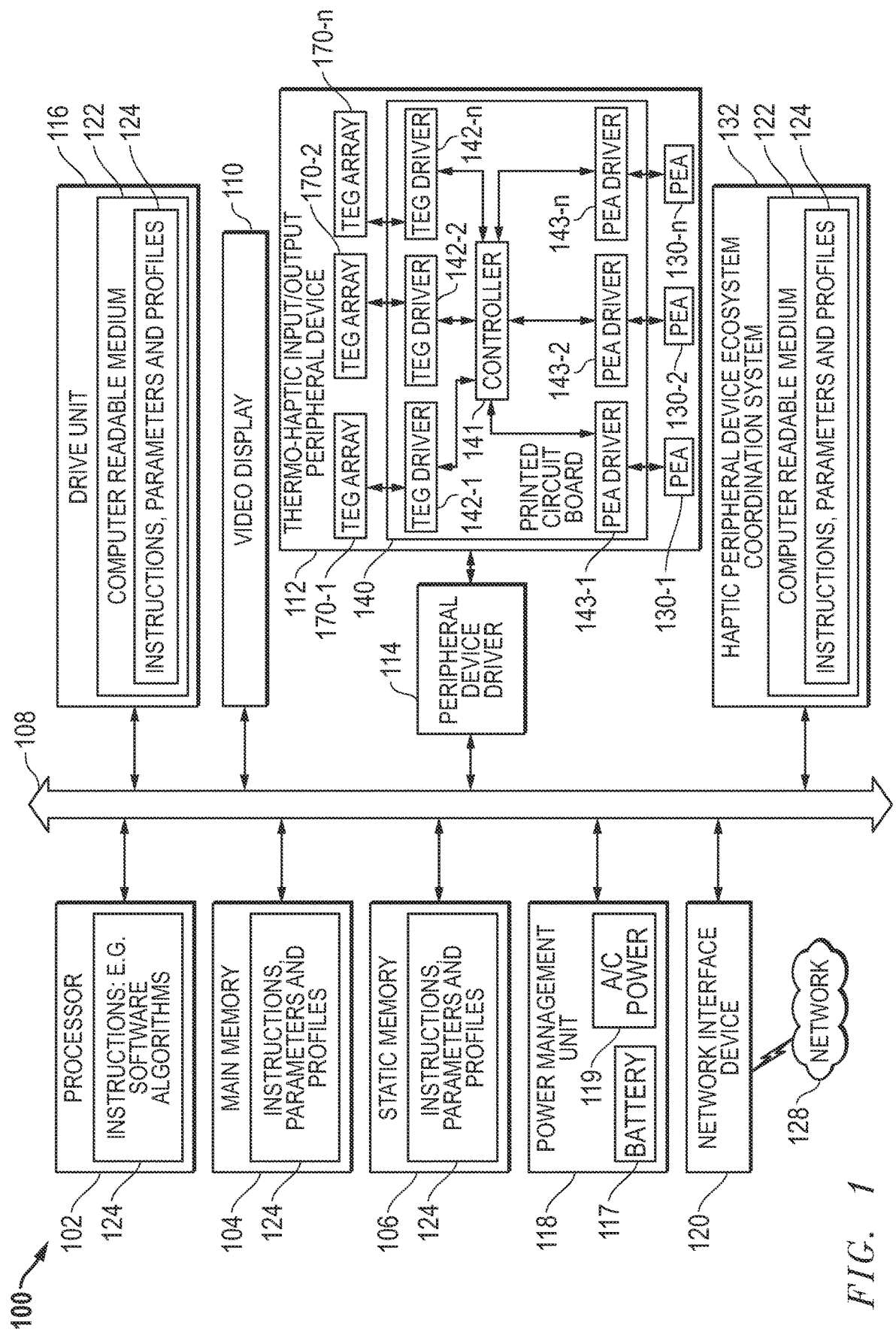
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Interest in immersive gaming experiences drives the computer gaming industry. Such immersive gaming experiences operate to provide the user with multi-sensory perception of actions occurring during live gameplay in which the user is participating. Early development of computer gaming involved low-level graphics and monophonic sound, such as that experienced while playing kiosk-type video games in arcades. The video and computer game industry has evolved over several decades to incorporate ever-improving visual graphics, surround-sound, high-definition sound, and in some cases, haptic movement such as vibrations. Early efforts at delivering such haptic movement included gaming console hand controllers that vibrate under certain conditions during live gameplay. For example, the Sony® PlayStation® or Microsoft® Xbox® controllers provided a vibrational pulse when an avatar representing the player inputting instructions via the controller incurred damage or was injured during live gameplay.

As computer-based gaming involving user input via a keyboard, mouse, or headset device has increased in popularity, a need has arisen for the incorporation of such haptic movement or thermo-haptic feedback into one or more portions of such a keyboard, mouse, or headset device. Thermo-haptic feedback may combine haptic movement (e.g., clicking, bumping, or vibrating) and a thermal change in temperature of a surface in contact with the user. The distributed surface area of an ecosystem of peripheral devices including the keyboard, mouse, and headset device presents an opportunity for thermo-haptic feedback at one or more of these peripheral devices to represent an event occurring within gameplay (e.g., player avatar incurring damage). For example, a three-dimensional gaming environment displayed pursuant to instructions of a gaming application via a video display in embodiments described herein may include an image of the player's avatar, an image of a non-player avatar (e.g., enemy avatar or ally avatar), and various objects (e.g., houses, cars, landscape, weapons, etc.). Each of these avatars and objects may move about the three-dimensional gaming environment in which they are displayed, based on movement of the player's avatar pursuant to user instructions input via any one of a plurality of peripheral input/output devices such as a keyboard, mouse, or headset. Gaming action events may also occur during gameplay, within the three-dimensional gaming environment, such as weapons fire, explosions, or other forms of attack between game avatars and objects. A system is needed to provide and coordinate thermo-haptic feedback (e.g., vibrations, changes in temperatures) to represent such gaming action events across multiple haptic regions of the plurality of peripheral input/output devices, such as the keyboard, palm rest, mouse, or headset, that correlates to the type (e.g., player avatar firing a weapon, player avatar taking damage) of the gaming action event.

The haptic peripheral device ecosystem coordination system in embodiments of the present disclosure provide and coordinate such thermo-haptic feedback at haptic regions across a plurality of thermo-haptic input/output peripheral devices (e.g., keyboard, palm rest, mouse, headset) correlating to the type of a gaming action event within a three-dimensional gaming environment. Piezoelectric actuators situated beneath (or otherwise co-located with) a thermoelectric generator (TEG) array, and beneath a housing of one or more of the peripheral input/output devices may provide the thermo-haptic feedback in embodiments described herein. A peripheral device controller in embodiments described herein may transmit an electrical charge to a specific piezoelectric actuator through a circuit matrix (e.g., printed circuit board assembly), based on a haptic region (e.g., portion of a palm rest, portion of a mouse, portion of a headset) identified in a haptic command received from the haptic peripheral device ecosystem coordination system. Upon application of the electrical charge to the piezoelectric actuator by the controller for the identified peripheral device (e.g., keyboard controller, mouse controller, or headset controller), a piezoelectric disc within the piezoelectric actuator may be mechanically stretched or compressed so as to create a tactile haptic movement event such as the piezoelectric actuator warping up or down and returning to its pre-deformed state in a clicking, bumping, or vibrating manner.

Similarly, the peripheral device controller in embodiments described herein may transmit an electrical charge to a specific thermoelectric generator (TEG) array, based on a haptic region (e.g., portion of a palm rest, portion of a mouse, portion of a headset) identified in a haptic command received from the haptic peripheral device ecosystem coordination system. Such TEG arrays in embodiments described herein may operate using the Peltier effect, also known as the thermoelectric effect, where application of a voltage to the p-doped and n-doped semiconductor pairs of the TEG array causes a change in temperature. In these embodiments, the top and bottom electric insulators of the TEG array may be either heated or chilled based on an amount of voltage or polarity of voltage applied at the TEG arrays.

The haptic peripheral device ecosystem coordination system in embodiments of the present disclosure provides such thermo-haptic feedback to specific portions of one or more of a plurality of peripheral devices within an ecosystem of peripheral devices, based on identified gaming action events occurring within live gameplay. The haptic peripheral device ecosystem coordination system in an embodiment may identify such live gameplay gaming action events, based on identification of one or more of a visual action event indicator, an audio action event indicator, and detected receipt of a user input command. Visual action event indicators in an embodiment may identified using a plurality of different methods, including, for example, a trained image recognition model. In some embodiments, the haptic peripheral device ecosystem coordination system may capture a plurality of images of gameplay during a training period. These training period captured images may include images of various avatars, or characters within the gaming environment. The avatars may be displayed in these captured training images at varying depths and viewing angles with respect to the player's perspective, and the avatars may be performing a variety of actions (e.g., firing or wielding a weapon, deflecting weapon's fire, moving toward or away from the player). The various avatars, which may also include an avatar of the user/player herself, as well as the actions taken by the avatars within each of these captured training images may be labeled to form a training dataset for an image recognition model.

These labeled, captured training images may then be input into an image recognition model in order to train the model to accurately identify the avatars and actions those avatars are taking within the captured training images. The image recognition model may be trained repeatedly on a plurality of such training datasets until the model can accurately make such identifications within a preset tolerance (e.g., 70% of the time or greater). Once the model is trained in such embodiments, captured images of live gameplay (e.g., images that have not yet been labeled to identify avatars or gaming action events) may be input into the trained image recognition model, which may then identify visual action event indicators associated with gaming action events occurring within live gameplay as it is displayed via the video display.

In another embodiment described herein, the haptic peripheral device ecosystem coordination system may identify such live gameplay visual action event indicators by analyzing shifts in pixel brightness detected by firmware for the video display device. In many gaming scenarios, damage to the player avatar or a non-player game character avatar (e.g., enemy or ally) may be accompanied by a bright occurrence such as a weapon firing or an explosion occurring. Firmware for the video display device in an embodiment may measure these changes in brightness, their size, location, and speed in real-time during live gameplay. Such firmware real-time analysis methods exist in the art in order to record the lag between a player inputting a user instruction (e.g., fire weapon) and display of the player avatar taking the action pursuant to such received user instruction, for example. The haptic peripheral device ecosystem coordination system in an embodiment may access these real-time pixel brightness measurements in some embodiments described herein to determine when a visual action event indicator associated with a gaming action event has occurred (e.g., an avatar firing a weapon, performing another type of attack, taking damage) as the visual action event indicator occurs during live gameplay.

In some embodiments described herein, the haptic peripheral device ecosystem coordination system may identify one or more audio action event indicators that are also associated with gaming action events. During live gameplay, the gaming software application may transmit an audio signal to a peripheral headset speaker device, and this audio signal may be stored in a medium accessible by the haptic peripheral device ecosystem coordination system. These audio signals in an embodiment may be analyzed to identify whether a known audio action event indicator, such a gunfire of varying durations, explosions, or sounds associated with the player avatar engaging with a stationary object (e.g., wading into water) within the 3D gaming environment has occurred during live gameplay. Audio action event indicators identified in such a way in embodiments described herein may also be associated with gaming action events.

The haptic peripheral device ecosystem coordination system may identify a gaming action event based on identification of a visual action event indicator, identification of an audio action event indicator, or a combination of both in embodiments described herein. In some embodiments, the haptic peripheral device ecosystem coordination system may further base such an identification of a gaming action event on receipt of a user input command via one or more of the thermo-haptic input/output peripheral devices (e.g., mouse or keyboard), or lack thereof. For example, the haptic peripheral device ecosystem coordination system may distinguish between gaming action events initiated by the player avatar and those not initiated by the player avatar based on a determination of whether a user provided an input command (e.g., fire weapon, move avatar in specific direction), just prior to detection of the visual action event indicator or audio action event indicator. By analyzing one or more of these visual action event indicators, audio action event indicators, and received user input commands, the haptic peripheral device ecosystem coordination system in an embodiment may identify a gaming action event that has occurred.

Upon determination that a specific gaming action event has occurred in embodiments of the present disclosure, the haptic peripheral device ecosystem coordination system may identify a haptic movement command, a haptic thermal command, or a combination of both that when executed by one of the thermo-haptic input/output peripheral devices may provide a thermo-haptic feedback specifically associated with the identified gaming action event. For example, the identified gaming action event of a player avatar taking damage may be associated with a haptic movement command to cause a single, long pulse of movement (e.g., vibration) at a high intensity at a region of the keyboard palm rest, and with a haptic thermal command to cause a long thermal increase of high intensity, also at the keyboard palm rest. The haptic peripheral device ecosystem coordination system in embodiments may transmit such haptic movement commands or haptic thermal commands to a controller of the thermo-haptic input/output peripheral device associated with such commands in order to initiate thermo-haptic feedback of a portion of the peripheral device (e.g., palm rest, headset, mouse) that correlates to the type of gaming action event identified as occurring within the virtual three-dimensional gaming environment. Various haptic movement types (e.g., vibration, click, bump, or other mechanical movement), at varying intensity levels, durations, or patterns, or thermal changes (heating or cooling) may correlate to various types of gaming action events (e.g., player avatar firing weapon, player avatar taking damage) in an embodiment. A haptic movement type, a thermal change, or a combination of the two may be referred to herein as thermo-haptic feedback.

The haptic command transmitted to the peripheral device controller via the haptic peripheral device ecosystem coordination system in embodiments described herein may identify a portion of the surface of a peripheral device (e.g., palm rest, mouse, headset) in contact with the user where thermo-haptic feedback should occur. The portion of the peripheral device in which thermo-haptic feedback occurs in embodiments may depend upon the identified gaming action event, and the avatar taking such action or to which such action is applied. For example, gaming action events affecting the player avatar (e.g., nearby explosion or gunfire, taking damage, moving into water) may be associated with thermo-haptic feedback (e.g., pulses of vibrational movement at varying intensities, or thermal increase or decrease of varying lengths and intensities) at the keyboard palm rest. As another example, gaming action events initiated by the player (e.g., firing a weapon) may be associated with thermo-haptic feedback at the mouse. As yet another example, gaming action events affecting an enemy avatar (e.g., enemy avatar taking damage) may be associated with thermo-haptic feedback at the headset device.

The type of thermo-haptic feedback initiated at a peripheral device surface in contact with the user in embodiments described herein may vary such that each of a plurality of available thermo-haptic feedbacks is associated with a specific gaming action event, avatar, or combination of the two. For example, thermo-haptic feedback may include a thermal increase or thermal decrease of varying durations and intensities. In embodiments, certain gaming action events such as player avatar firing a weapon, explosions or gunfire occurring nearby the player avatar, the player avatar taking damage may be associated with a thermal increase, while other events, such as the player avatar moving into water or the enemy avatar taking damage may be associated with a thermal decrease. In order to differentiate between each of these gaming action events, these thermal increases or decreases may be applied at varying durations or intensities. For example, the player avatar firing a single shot may be associated with a short thermal increase of low intensity while an explosion occurring nearby the player avatar may be associated with a long thermal increase of high intensity. As another example, the player avatar moving into water may be associated with a long thermal decrease of high intensity while the enemy avatar taking damage may be associated with a short thermal decrease of high intensity.

Thermo-haptic feedback may also include a haptic movement of varying types, durations and intensities, with each of the plurality of available haptic movements being associated with at least one gaming action event. For example, certain gaming action events such as player avatar firing a weapon, explosions or gunfire occurring nearby the player avatar, the player avatar taking damage may be associated with a single haptic movement or burst (e.g., pulse or cluster) of haptic movement, while other events, such as the player avatar continuously shooting or moving into water, or the enemy avatar taking damage may be associated with multiple bursts (e.g., pulses or clusters) of haptic movement. In order to differentiate between each of these gaming action events, these haptic movements may be applied at varying durations or intensities. For example, the player avatar continuously shooting may be associated with multiple short pulses of movement at a low intensity, while an explosion occurring nearby the player avatar may be associated with a single, long pulse of movement at a high intensity. In such a way, embodiments of the present disclosure may identify occurrence of a gaming action event, identify a thermo-haptic feedback associated with that gaming action event, and initiate the identified thermo-haptic feedback at one of a plurality of peripheral input/output devices with which the user is in physical contact through execution of one or both of a haptic movement command or a haptic thermal command. This may increase the user's immersion into the virtual 3D gaming environment of its avatar.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In an example embodiment, the information handling system 100 may include a laptop or desktop gaming system that executes a gaming application (e.g., as instructions 124). The gaming application may include any computer code that is executed by a processor 102 of the information handling system 100 in order to allow the user to engage with a gaming environment via input/output (I/O) devices (e.g., 112), a video/graphics display device 110 or any other input or output device. The thermo-haptic input/output peripheral device 112 may comprise various types of input/output devices in various embodiments described herein. For example, the thermo-haptic input/output peripheral device in an embodiment may comprise a thermo-haptic headset device, a thermo-haptic mouse, or a thermo-haptic keyboard and palm rest assembly.

The thermo-haptic input/output peripheral device 112, as described herein, may further provide thermo-haptic feedback to the user in order to further immerse the user into the action presented to the user via the execution of the gaming application. This haptic feedback may originate from the selective activation of one or more thermo-electric generator (TEG) arrays 170-1, 170-2, 170-n that heat or cool a portion of a housing of the thermo-haptic input/output peripheral device 112. A TEG array 170-1, 170-2, 170-n may include a two or more TEGs that, in the embodiments herein, include a p-doped and n-doped semiconductor sandwiched between a top electric insulator and bottom electric insulator both made of, for example, a ceramic. In the present specification and in the appended claims, a TEG array 170-1, 170-2, 170-n is defined as a group of TEGs that may or may not be coupled in series.

Additional haptic feedback may originate from the selective activation of one or more piezo-electric actuators (PEAs) 130-1, 130-2, 130-n that produce haptic movement (e.g., click, bump, vibration, or other mechanical movement) against a portion of the housing of the thermo-haptic input/output peripheral device 112. These types of thermo-haptic feedback may be coordinated with actions conducted in the gaming environment displayed on the video/graphics display device 110 during execution of the gaming application.

Various example gaming environments may result in how the TEG arrays 170-1, 170-2, 170-n and PEAs 130-1, 130-2, 130-n provide the thermo-haptic feedback to the user through the thermo-haptic input/output peripheral device 112. Details of the activation of the TEG arrays 170-1, 170-2, 170-n and PEAs 130-1, 130-2, 130-n based on the gaming environment are described in more detail herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices 112, such as a keyboard and palm rest, a mouse, a headset device incorporating one or more microphones and one or more speakers, a touchpad, ambient light sensors, or any combination thereof. The information handling system 100 may also include a power management unit 118 supplying power to the information handling system 100, via a battery 117 or an alternating current (A/C) power adapter 119, a video/graphic display 110, and one or more buses operable to transmit communications between the various hardware components. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Specifically, the processor 102 may operate to execute code instructions of firmware for the video/graphics display 110 in an embodiment. Moreover, the information handling system 100 may include memory such as main memory 104, static memory 106, or other memory of computer readable medium 122 storing instructions 124 of the haptic peripheral device ecosystem coordination system 132 of a gaming application or other application, and drive unit 116 (volatile (e.g., random-access memory, etc.), nonvolatile memory (read-only memory, flash memory etc.) or any combination thereof. A processor 102 may further provide the information handling system with a system clock for which a time of day clock may be tracked along with any location detector such as global positioning system or in coordination with a network interface device 120 connecting to one or more networks 128. The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include a thermo-haptic input/output peripheral device 112, such as a cursor control device (e.g., mouse, touchpad, or gesture or touch screen input), a keyboard, a palm rest of a keyboard, or a headset device incorporating speakers or microphones. Various drivers (e.g., 114) and control electronics (e.g., controller 141) may be operatively coupled to operate input devices (e.g., thermo-haptic input/output peripheral device 112) according to the embodiments described herein.

The network interface device 120 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 120 may operate two or more wireless links.

Network interface device 120 may connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. For example, a controller 141 may operate to transmit electrical charges to piezoelectric actuators (PEAs) (e.g., 130-1, 130-2, 130-n) located within the thermo-haptic input/output peripheral device 112, pursuant to haptic commands received from the haptic peripheral device ecosystem coordination system 132, to cause a haptic movement (e.g., vibration, click, bump, or other mechanical movement) beneath specifically identified haptic regions of the thermo-haptic input/output peripheral device (e.g., mouse, keyboard palm rest, or headset). As another example, controller 141 may operate to transmit electrical charges to TEG arrays 170-1, 170-2, 170-n located within the thermo-haptic input/output peripheral device 112, pursuant to haptic commands received from the haptic peripheral device ecosystem coordination system 132 to cause an increase or decrease in thermal temperature at a portion of the surface of the input/output peripheral device 112.

As another example, firmware for the video display 110 may operate to measure and record magnitude, size, and speed of changes in pixel brightness during execution of a gaming application via processor 102. Such changes in brightness may, in some embodiments, be used in determination of gaming action events by a haptic peripheral device ecosystem coordination system 132 executable software code. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device 120.

The information handling system 100 may include a set of instructions 124 that may be executed to cause the computer system to perform any one or more of the methods or computer-based functions disclosed herein. As an example, instructions 124 may execute a haptic peripheral device ecosystem coordination system 132, a peripheral device driver 114, software agents, or other aspects or components. As another example, peripheral device driver 114 may operate to receive commands from or provide output to input/output device driver 112 such as keystroke input, mouse inputs, light or sound outputs or the like. Peripheral device driver 114 may also be incorporated with operation of the haptic peripheral device ecosystem coordination system 132 for providing thermostatic feedback via controller or controllers 141 to input/output devices 112. In various embodiments herein, the instructions 124 may execute any type of gaming applications. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. In some embodiments, instructions 124 may comprise another application, such as executable code for a variety of software gaming system applications. A software gaming system application 124 in some embodiments may transmit instructions to the peripheral device driver 114, or controller 141, indicating that an identified gaming action event that is associated with thermo-haptic feedback of a portion or haptic region of the thermo-haptic input/output peripheral device 112 has occurred.

The disk drive unit 116 and the haptic peripheral device ecosystem coordination system 132 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the haptic peripheral device ecosystem coordination system 132 and peripheral device driver 114, code instructions of various software gaming applications, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some of or all the haptic peripheral device ecosystem coordination system 132 and peripheral device driver 114 may be executed locally or remotely. The main memory 104 and the processor 102 also may include computer-readable media.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic peripheral device ecosystem coordination system 132 and peripheral device driver 114 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 118 (a.k.a. a power supply unit (PSU)). The PMU 118 may manage the power provided to the components of the information handling system 100 such as the processor 102, a cooling system such as a bank of fans, one or more drive units 116, a graphical processing unit (GPU), the video/graphic display device 110, and other components that may require power when a power button has been actuated by a user. In an embodiment, the PMU 118 may be electrically coupled to the bus 108 to provide this power. The PMU 118 may regulate power from a power source such as a battery 117 or A/C power adapter 119. In an embodiment, the battery 117 may be charged via the A/C power adapter 119 and provide power the to the components of the information handling system 100 when A/C power from the A/C power adapter 119 is removed.

The information handling system 100 may also include the haptic peripheral device ecosystem coordination system 132 that may be operably connected to the bus 108. The haptic peripheral device ecosystem coordination system 132 computer readable medium 122 may also contain space for data storage. The haptic peripheral device ecosystem coordination system 132 may, according to the present description, perform tasks related to identifying gaming action events within live gameplay of a gaming application, associating that gaming action event with a haptic region of the thermo-haptic input/output peripheral device 112 and causing thermo-haptic feedback to occur at the identified haptic region. The haptic peripheral device ecosystem coordination system 132 in an embodiment may execute code instructions to identify the gaming action events and to identify the haptic region of the thermo-haptic input/output peripheral device where haptic movement is appropriate, based on the identified gaming action event and its location.

The haptic peripheral device ecosystem coordination system 132 in an embodiment may identify gaming action events displayed within live gameplay according to various methods described herein. For example, the haptic peripheral device ecosystem coordination system 132 may detect gaming action events based on measured changes in pixel brightness in various regions of the video display 110, as recorded by firmware of the video display 110. As another example, the haptic peripheral device ecosystem coordination system 132 may train an image recognition model to identify the avatars, objects, and associated gaming action events based on a plurality of captured images of training gameplay (e.g., captured prior to current or live gameplay). In such an embodiment, the training of the image recognition model may occur within the computing device incorporating the video display 110, and thermo-haptic input/output peripheral device 112, or may occur within a portion of the haptic peripheral device ecosystem coordination system 132 operating in a cloud environment and communicably coupled to that computing device. As such, the haptic peripheral device ecosystem coordination system 132 in some embodiments may operate in part upon a user-operated computing device executing code instructions of the gaming applications displayed via the video display 110, and in part at a cloud-based server or server remote from the user-operated computing device in some embodiments. Upon training a machine learning model, the haptic peripheral device ecosystem coordination system 132 may detect gaming action events during gameplay that warrant haptic feedback via a machine learning inference model recognition of gaming action events, or by coded game instructions for haptic feedback during gameplay. As described herein, in yet other embodiments, a software gaming system application (e.g., code 124) may have code instructions programmed into the gaming application to transmit instructions to the controller 141, indicating that an identified gaming action event that is associated with haptic movement of a portion or haptic region of thermo-haptic input/output peripheral device 112 has occurred to generate thermo-haptic feedback.

The haptic peripheral device ecosystem coordination system 132 may, according to the present description, perform tasks related to providing, as output, an image recognition dataset descriptive of recognized game action event environmental data that is experienced during execution of the gaming application. The image recognition dataset may be used by the processor 102 executing a thermo-haptic feedback model evaluation system to provide thermo-haptic commands to a TEG array **170-1, 170-2, 170-*n* and one or more piezoelectric actuators (PEAs) 130-1, 130-2, 130-*n* to provide thermo-haptic feedback commensurate with the game action environment experienced during game play. This may be done in real-time as the user engages with the gaming environment by an inference model machine learning system for the gaming application. In the present specification, the term "thermo-haptic feedback" is meant to be any changes in temperature, mechanical movement (e.g., click, bump, or vibration), or both felt by a user due to the activation of one or more of the TEG arrays 170-1, 170-2, 170-*n* and PEAs 130-1, 130-2, 130-*n***.

In an embodiment, the haptic peripheral device ecosystem coordination system 132 may have a convolutional neural network that is trained by receiving, as training input, captured images obtained during the execution of a gaming application. These captured images may be from any angle within the environment and may, in some embodiments, include an avatar. In the present specification and in the appended claims, the term "avatar" is meant to include any graphical representation of a user, a user's character, or a persona placed within or interacting within the gaming environment. The captured images used to train the haptic peripheral device ecosystem coordination system 132 convolutional neural network or other machine learning model may also include representations of other environmental characteristics such as objects, actions, or other environmental characteristics. A non-exhaustive list of environmental characteristics may include a weapon firing, an explosion, an avatar being struck, an avatar's interaction with objects within the gaming environment (cold snow, warm sand, shaking ground, etc.), noises, light, among other environmental characteristics. Each of these types of environmental characteristics may be captured in an image during, in an embodiment, a training period. The training period may be conducted during execution of the gaming application by the processor 102. This training period may be a dedicated duration of time whether during actual gaming interactions by the user or not. For example, during execution of the gaming application, the user may be directed by the gaming application to engage in a "demo" portion of the gaming environment that allows the processor 102 to capture the images and provide those images to the haptic peripheral device ecosystem coordination system 132. Alternatively, or additionally, the images may be captured by the processor 102 during execution of the gaming application and during actual game play by the user. In this embodiment, the haptic peripheral device ecosystem coordination system 132 may be trained while the user engages in the interaction with the gaming environments thereby allowing the output from the haptic peripheral device ecosystem coordination system 132 to be more refined the longer the player engages with that gaming environment.

In an embodiment, the haptic peripheral device ecosystem coordination system 132 may be code instructions and operate with the main memory 104, the processor 102, the video display 110, the thermo-haptic input/output peripheral device 112, and the NID 120 via bus 108, and several forms of communication may be used, including ACPI, SMBus, a 24 MHZ BFSK-coded transmission channel, or shared memory. Driver software, firmware, controllers, and the like may communicate with applications on the information handling system 100. During this process and after the haptic peripheral device ecosystem coordination system 132 has been trained, the processor 102 may receive the output from the haptic peripheral device ecosystem coordination system 132 that defines the image recognition dataset descriptive of recognized game action event environmental data during execution of the gaming application. An inference model trained neural network or other machine learning model of the haptic peripheral device ecosystem coordination system 132 may operate to recognize gaming images in real time to identify gaming action events. Upon receipt of this dataset, the processor 102 may execute a model evaluation system. The model evaluation system may be computer code or may be an ASIC that evaluates the accuracy of the image recognition dataset to determine whether the accuracy reaches a threshold. For example, the model evaluation system may determine whether the environmental characteristics represent those environmental characteristics of a game action event associated with thermo-haptic feedback at the thermo-haptic input/output peripheral device 112. Where the model evaluation system has determined that the output from the haptic peripheral device ecosystem coordination system 132 has reached a threshold accuracy, the processor 102 causes signals to be sent to the TEG arrays **170-1, 170-2, 170-*n* or PEAs 130-1, 130-2, 130-*n*** to provide this thermo-haptic feedback described herein.

In order to send the thermo-haptic signals from the processor 102, the information handling system 100 may implement a peripheral device driver 114. The peripheral device driver 114 may include any computer code that operates to control the thermo-haptic input/output peripheral device 112 by relaying signals from the processor 102 to a peripheral device controller 141. The thermo-haptic input/output peripheral device controller 141 may execute more functions such as cursor location, click selection, scroll functions and others as understood for mouse pointing device operation according to embodiments herein. The thermo-haptic input/output peripheral device controller 141 may further control the relaying of the thermo-haptic signals from the processor 102 to each of the piezoelectric actuator (PEA) drivers **143-1, 143-2, 143-*n* and thermoelectric generator (TEG) drivers 142-1, 142-2, 142-*n*. Similar to the peripheral device driver 114, the TEG drivers 142-1, 142-2, 142-*n* and PEA drivers 143-1, 143-2, 143-*n* may include computer code that, when executed by the thermo-haptic input/output peripheral device controller 141, selectively activates the respective operatively coupled TEG arrays 170-1, 170-2, 170-*n* and PEAs 130-1, 130-2, 130-*n*. Each of the TEG arrays 170-1, 170-2, 170-*n* may be operatively coupled to the thermo-haptic input/output peripheral device controller 141 via a serial connector, for example, formed on a printed circuit board (PCB) 140. The PCB 140 may, in an embodiment, be a dedicated PCB 140 apart from a PCB used to mount the thermo-haptic input/output peripheral device controller 141** and which serves as a PCB for other functions on the thermo-haptic input/output peripheral device 112. For example, the PCB 140 in an embodiment in which the thermo-haptic input/output peripheral device 112 comprises a mouse may serve other functions such as mouse button actuators, a position tracking system (e.g., trackball, optical systems, gyroscopes, etc.), scroll functions, and the like. As another example, the PCB 140 in an embodiment in which the thermo-haptic input/output peripheral device 112 comprises a keyboard and palm rest assembly may serve other functions such as registering of keystrokes at one or more keycaps operatively coupled to the PCB 140, or initiation of haptic movement at one or more of such keycaps, and the like. As yet another example, the PCB 140 in an embodiment in which the thermo-haptic input/output peripheral device 112 comprises a headset including speakers or microphones, may serve other functions such as capturing of audio instructions via the microphone or playback of audio signals received from the gaming application via the speakers, and the like. The haptic peripheral device ecosystem coordination system 132 may render thermo-haptic feedback based on 3D gaming environment location of or type of gaming action events and activate the input/output device 112 or TEG or PEA portions of each input/output device 112. Thus, the haptic peripheral device ecosystem coordination system 132 can coordinate where the thermo-haptic feedback is sent in the haptic peripheral device ecosystem a user may utilize when gaming.

The TEG arrays 170-1, 1740-2, 170-$n$ may be arranged in a way to impart a heating effect or chilling effect on a surface of a housing of the thermo-haptic input/output peripheral device 112. This may include those surfaces of the thermo-haptic input/output peripheral device 112 that the user may touch. The TEG arrays 170-1, 1740-2, 170-$n$ may, in an embodiment, form zones across the surface of the thermo-haptic input/output peripheral device 112 that can be individually heated or cooled.

In an embodiment, each of the TEG arrays 170-1, 1740-2, 170-$n$ may be an array of TEGs formed on a flexible substrate. For example, a first TEG array 170-1 may include a plurality of TEGs that each includes a p-doped and n-doped semiconductor sandwiched between a top electric insulator and bottom electric insulator both made of, for example, a ceramic. Each of the of p-doped and n-doped semiconductors may be soldered between two ceramic plates and placed electrically in series and thermally in parallel to each other to form each of the TEGs. In an embodiment, the TEG arrays 170-1, 1740-2, 170-$n$ may operate using the Peltier effect, also known as the thermoelectric effect, where application of a voltage to the p-doped and n-doped semiconductor pairs causes a change in temperature. In these embodiments, the top and bottom electric insulators may be either heated or chilled based on an amount of voltage or polarity of voltage applied at a TEG lead operatively coupled to the array of TEG array 170-1, 1740-2, 170-$n$.

In another embodiment, a second TEG array 170-2 may also include sets of p-doped and n-doped semiconductor sandwiched between a top electric insulator and bottom electric insulators. These sets of p-doped and n-doped semiconductors may be operatively coupled together in series to receive a voltage at the first TEG lead. In this embodiment, the sets of semiconductors, each forming a TEG, may be arranged in series and activated together to either heat or chill the housing of the thermo-haptic input/output peripheral device 112 together depending on magnitude or voltage applied via the first TEG lead and a second TEG lead.

In an embodiment, the second TEG array 170-2, for example, may include a first set of TEGs coupled to a first TEG lead (forming a first array of TEGs) with a second set of TEGs coupled to a second first TEG lead (forming a second array of TEGs). Each of the first and second sets of TEGs may be operatively coupled to a flexible substrate such that the first and second sets of TEGs are placed adjacent to an interior surface of the housing of the thermo-haptic input/output peripheral device 112. During operation, in this embodiment, the first set of TEGs of the second TEG array 170-2 may be heated or cooled independent of whether the second set of TEGs second TEG array 170-2 is heated or cooled. This may allow the first set of TEGs to be heated and then cooled independently (e.g., sequentially) with the heating and cooling of the second set of TEGs. Thus, to the perspective of the user, the rendered thermo-haptic response feels like a heat wave has passed across the outer surface of the thermo-haptic input/output peripheral device 112 in coordination with the gaming action event. As will be described herein, this selective and sequential heating and cooling of the individual TEG arrays may indicate environmental characteristics occurring, in real time, within the gaming environment. By way of example, the gaming application may be a first-person gaming application having a warfare genre. It is understood that these warfare genre games may include explosions represented to the user on the video/graphics display device 110. Because such and explosion, in real life, would pass to and over a user, this environmental characteristic may be recognized by the processor 102 and thermo-haptic feedback model evaluation system as a heat (and vibration) haptic feedback to be represented by at the first TEG array 170-1, the second TEG array 170-2, and any additional TEG array 170-$n$. Because the heat wave may pass an avatar in a wave motion, each of the TEG arrays 170-1, 170-2, 170-$n$ may be sequentially activated to impart a heat across the surface of housing of the thermo-haptic input/output peripheral device 112 in a wave action. This may indicate to a user a direction and intensity of explosion that had occurred near the avatar adding to the output received by the user. Similar actions may occur when a cold wave, such as an ice blast, pass an avatar with the TEG arrays 170-1, 170-2, 170-$n$ being selectively activated by the thermo-haptic input/output peripheral device controller 141 to represent a cold wave passing by the avatar. It is appreciated herein that specific use-cases are described that define specific types of environmental characteristics that activate each of the TEG arrays 170-1, 170-2, 170-$n$ in order to provide to a user actions that occurred within the gaming environment. Other use-cases are contemplated herein and described herein further.

As described herein, the thermo-haptic input/output peripheral device 112 may include one or more PEAs 130-1, 130-2, 130-$n$. The PEAs 130-1, 130-2, 130-$n$ may be used to impart a vibration or click against an interior surface of the housing of the thermo-haptic input/output peripheral device 112 to be felt by the user. Like the TEG arrays 170-1, 170-2, 170-$n$, each of the PEAs 130-1, 130-2, 130-$n$ may be operatively coupled to a PCB 140 via a serial connector that operatively couples the PEAs 130-1, 130-2, 130-$n$ to the thermo-haptic input/output peripheral device controller 141 and processor 102 of the information handling system. Upon receipt of the haptic command at the controller 141, the controller 141 may apply an electrical charge (e.g., via one or more printed circuit boards 140 or other matrix circuits as described herein) to the piezoelectric actuator (e.g., 130-1, 130-2, 130-$n$) disposed within the haptic region of the thermo-haptic input/output peripheral device 112 identified within the haptic command. The electrical charge applied to the PEA 130-1, 130-2, or 130-*n* (i.e., having a specific current and voltage) may cause the PEA 130-1, 130-2, or 130-*n* to convert that electrical charge into a mechanical stress by, for example, causing the PEA 130-1, 130-2, or 130-*n* to warp upward or warp downward. The mechanical stress of the PEA 130-1, 130-2, or 130-*n* due to the application of the electrical charge may be felt by a user as haptic movement of a portion of the surface of the thermo-haptic input/output peripheral device 112.

In an embodiment, the haptic peripheral device ecosystem coordination system 132 may also include one or more sets of instructions that, when executed by a controller 140, a processor, or both, adjusts the polarity, voltage, or current of electrical charges applied to any PEA 130-1, 130-2, or 130-*n*. This adjustment may be completed based on the desired haptic responses from the PEA 130-1, 130-2, or 130-*n*, the lifespan of the PEA 130-1, 130-2, or 130-*n*, the electrical characteristics of the PEA 130-1, 130-2, or 130-*n*, the mechanical characteristics of the PEA 130-1, 130-2, or 130-*n*, or combinations thereof. Because these characteristics may be different from one piezoelectric actuator to the other, the electrical charges applied to any given PEA 130-1, 130-2, or 130-*n* by the controller 141 may be customized to produce a specific level of haptic movement (e.g., haptic movement feedback such as vibration, click, bump, or other mechanical movement in varying durations, intensities, or patterns) at any given surface portion of the thermo-haptic input/output peripheral device 112 as rendered among input/output devices 112 based on location or type of gaming action event as determined by haptic peripheral device ecosystem coordination system 132. In an embodiment, the controller 141 of the information handling system 100 may access one or more look-up tables (e.g., movement look-up table). In this embodiment, the controller 141 of the information handling system 100 may access the look-up tables in order to determine characteristics (e.g., voltage magnitude, frequency, polarity) of an electrical charge to be applied to any given piezoelectric actuator to achieve known haptic movement intensity levels. The one or more sets of instructions of the haptic peripheral device ecosystem coordination system 132 may also include one or more sets of instructions that, when executed by the controller 141, causes any number of subsequent voltage pulses to be applied to any PEA 130-1, 130-2, or 130-*n* to generate haptic movement feedback such as vibration, click, bump, or other mechanical movement in varying durations, intensities, or patterns. Each of the PEAs 130-1, 130-2, 130-*n* may be concurrently or sequentially activated based, again, on data signals received from the processor 102 for determined gaming action events by the haptic peripheral device ecosystem coordination system 132. For example, the rumble or quake of an avalanche or a structure toppling detected gaming action event may impart a moving vibration haptic feedback rendered at one or more input/output devices 112.

The training of the haptic peripheral device ecosystem coordination system 132 may also provide to the processor those image recognition datasets descriptive of recognized game action event environmental data during execution of the gaming application as output. The thermo-haptic feedback model evaluation system may interpret this output as specific environmental characteristics that have or are occurring during execution of the gaming application that relate to gaming action events. Signals are produced that are used to activate the individual PEAs 130-1, 130-2, 130-*n* by the thermo-haptic input/output peripheral device controller 141 to represent to the user those environmental characteristics during game play. Again, it is appreciated herein that specific use-cases are described that define specific types of environmental characteristics that activate each of the PEAs 130-1, 130-2, 130-*n* to provide, to a user, haptic feedback based on actions that occurred within the gaming environment. Other use-cases are contemplated herein and described herein further (e.g., with respect to Table 1).

In a specific embodiment, the information handling system 100 may execute a basic input/output system (BIOS). In an embodiment, the haptic peripheral device ecosystem coordination system 132 may communicate with the main memory 104, the processor 102, the video display 110, the thermo-haptic input/output peripheral device 112, and the network interface device 120 via bus 108, and several forms of communication may be used, including ACPI, SMBus, a 24 MHZ BFSK-coded transmission channel, or shared memory. Keyboard or touchpad driver software, firmware, controllers and the like may communicate with applications on the information handling system 100. Similarly, video display driver software, firmware, controllers and the like may communicate with applications on the information handling system 100 as well as with the piezo keyboard driver in some embodiments herein. For example, video display 110 may include display scalar hardware operating to emit light at varying brightness levels via a plurality of pixels of the video display 110. Further, firmware for the video display 110 in an embodiment may operate to monitor changes in brightness at each of these pixels in order to detect pixel regions within the video display 110 undergoing changes in brightness (e.g., due to display of an explosion during live gameplay) indicating a gaming action event.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
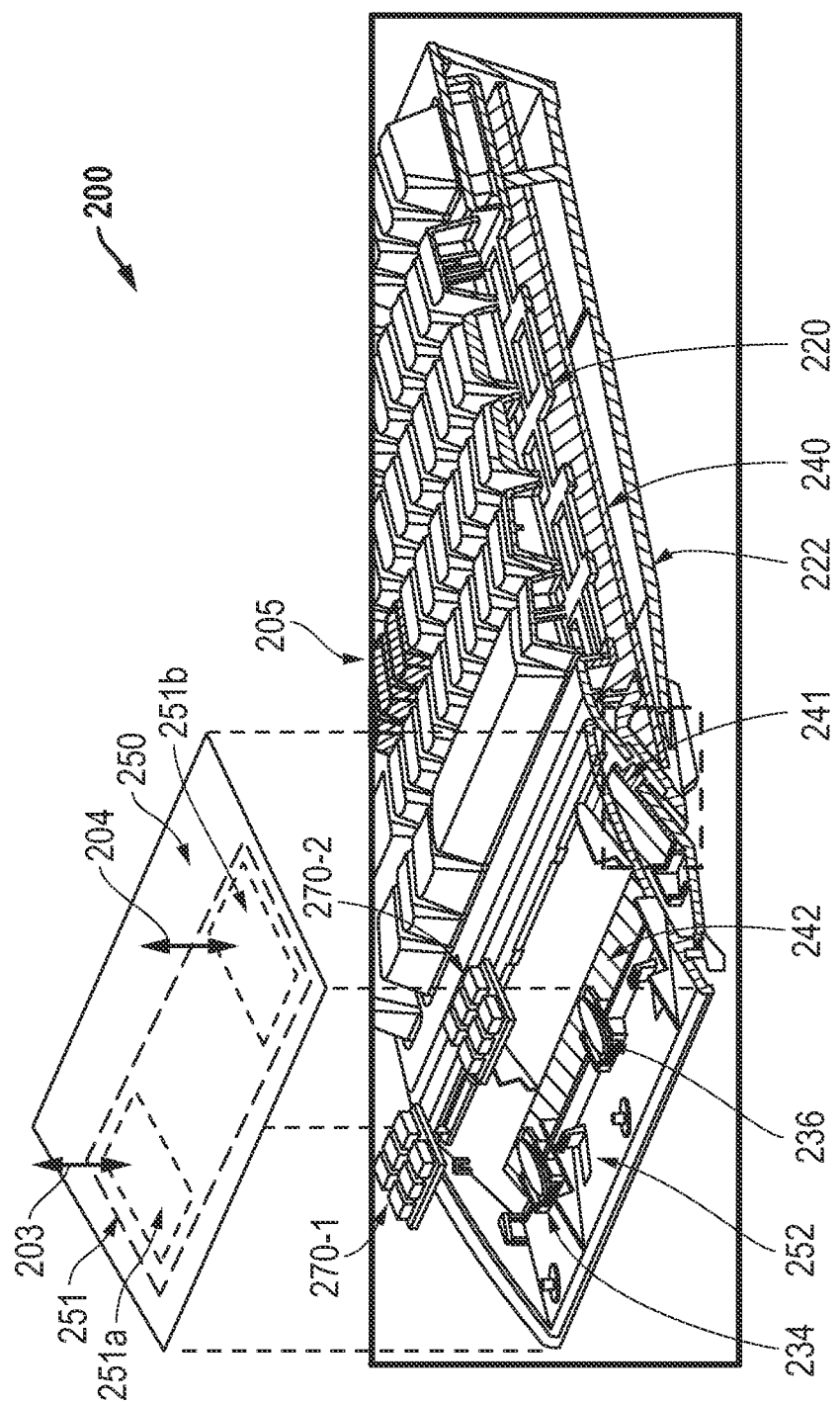
FIG. 2 is a side cut-out view of a haptic palm rest portion and a thermo-haptic keyboard assembly according to an embodiment of the present disclosure.

FIG. 2 is a side cut-out view of a palm rest portion of a thermo-haptic keyboard and palm rest assembly 200 implementing a piezoelectric actuator and a thermoelectric generator (TEG) array according to an embodiment of the present disclosure. As described herein, piezoelectric actuators (PEAs) and thermoelectric generation (TEG) arrays situated within a thermo-haptic keyboard and palm rest assembly 200 may provide thermo-haptic feedback in various regions of the thermo-haptic keyboard and palm rest assembly 200 in embodiments described herein. A haptic command transmitted by the haptic peripheral device ecosystem coordination system to the keyboard controller of the information handling system in an embodiment may initiate thermo-haptic feedback of a haptic region of the thermo-haptic keyboard and palm rest assembly 200 that correlates to a type or relative location of gaming action event detected as having occurred in live gameplay. The thermo-haptic feedback initiated by the controller in such a way may render a haptic movement (e.g., click, bump, vibration, or other mechanical movement) or a thermal change to occur within the haptic regions, so as to be felt by the user, who may be in close contact with the identified haptic region relative to the type or location of a gaming action event.

Thermo-haptic feedback comprising haptic movement may be provided via one or more piezoelectric actuators or thermoelectric generators situated under one or more keys 205 of a keyboard portion of thermo-haptic keyboard and palm rest assembly 200 in some embodiments. For example, a thermo-haptic keyboard and palm rest assembly 200 in an embodiment may include multiple haptic keys 205 having piezoelectric actuators or thermoelectric generators mounted under a keycap on a key actuation switch or under a key actuation switch where haptic movement is provide to the key 205 through the key actuation switch mechanism.

The keyboard main printed circuit board assembly 240 may be operably connected to the piezoelectric actuator or thermoelectric generators under one or more keys 205 such that an electrical charge may be transmitted to the haptic keys 205 via the keyboard main printed circuit board assembly 240, pursuant to a haptic command received from the keyboard controller operably connected to the keyboard main printed circuit board assembly 240. For example, the keyboard main printed circuit board assembly 240 may be operably connected to each key 205 via a key switch circuit board mounted with key support chassis 220. The keyboard main printed circuit board assembly 240 may receive a haptic command from the haptic peripheral device ecosystem coordination system, via a keyboard controller in an embodiment. For example, in an embodiment, the haptic peripheral device ecosystem coordination system may generate a haptic command upon detecting occurrence of a specific gaming action event within a virtual 3D gaming environment displayed via a video display of the information handling system (e.g., information handling system 100 described with reference to FIG. 1). The haptic command may be rendered for feedback based on type or location of gaming action event and include an identification of a specific haptic zone that represents a haptic key 205 of the thermo-haptic keyboard at which a thermo-haptic feedback should occur.

Thermo-haptic feedback comprising haptic movement may also be provided via one or more piezoelectric actuators situated across the width of the palm rest of a thermo-haptic keyboard and palm rest assembly 200 in some embodiments. For example, a thermo-haptic keyboard and palm rest assembly 200 in an embodiment may include a palm rest enclosed by a palm rest top cover 250, and a palm rest bottom cover 252. A palm rest printed circuit board assembly 242 and a plurality of piezoelectric actuators (e.g., first or left palm rest piezo electric actuator 234 and second or right palm rest piezoelectric actuator 236) may be incorporated within the palm rest of the thermo-haptic keyboard and palm rest assembly in an embodiment. On the right side of palm rest (not shown due to cut-away) additional piezoelectric actuators may be disposed (e.g., third and fourth palm rest piezoelectric actuators) for a user's right hand in some embodiments.

The palm rest printed circuit board assembly 242 may be operably connected to a keyboard main printed circuit board assembly 240 such that an electrical charge may be transmitted to the palm rest printed circuit board assembly 242 via the keyboard main printed circuit board assembly 240, pursuant to a haptic command received from the keyboard controller operably connected to the keyboard main printed circuit board assembly 240. For example, the keyboard main printed circuit board assembly 240 may be operably connected to a junction printed circuit board assembly 242 via one or more spring-loaded connector pins (e.g., 241), such as a pogo pin, which may be situated between the palm rest printed circuit board assembly 242 and the keyboard main printed circuit board assembly 240. Thus, pogo pin 241 (and other pogo pins), the palm rest printed circuit board assembly 242 and each of the piezoelectric actuators (e.g., 234 and 236) situated within the palm rest assembly may be electrically coupled such that an electrical pulse generated at the keyboard main printed circuit board assembly 240 may be transmitted via one of the pogo pins (e.g., 241), through a portion of the palm rest printed circuit board assembly 242 to one of the piezoelectric actuators (e.g., 234) situated within the palm rest.

The keyboard main printed circuit board assembly 240 may receive a haptic command from the haptic peripheral device ecosystem coordination system, via a keyboard controller in an embodiment. For example, in an embodiment, the haptic peripheral device ecosystem coordination system may generate a haptic command upon detecting occurrence of a specific gaming action event within a virtual 3D gaming environment displayed via a video display of the information handling system (e.g., information handling system 100 described with reference to FIG. 1). The haptic command may be rendered for feedback based on type or location of gaming action event and include an identification of a specific haptic zone 251 of a palm rest at which a thermo-haptic feedback should occur. Thus, palm rest haptic zone 251 may be correlated to the type of gaming action event identified, based on the presence of a visual action event indicator, an audio action event indicator, or a combination of the two. Specific examples are presented in Table 1, below:

TABLE 1

| Action Event | Visual Action Event Indicator | Audio Action Event Indicator | Haptic Movement Command | Haptic Thermal Command | Haptic Region |
|---|---|---|---|---|---|
| Player avatar fires single shot | Single large flash burst at player avatar | Short, loud audio spike in gun audio wave pattern | Single, short pulse of movement at low intensity | Short thermal increase of low intensity | Mouse |
| Player avatar continuous shooting | Repeated large flash burst at player avatar | Repeated, short, loud audio spike in gun audio wave pattern | Multiple short pulses of movement at low intensity | Long thermal increase of low intensity | Mouse |
| Explosion nearby player avatar | Single, large flash burst near player avatar and enemy avatar firing | Short, loud audio spike in explosion audio wave pattern | Single, long pulse of movement at high intensity | Long thermal increase of high intensity | Keyboard/ Keyboard Palm Rest |
| Enemy bullet landing nearby player avatar | Single, medium flash burst to either side of player avatar | Short, loud audio spike in gun audio wave pattern | Single, short pulse of movement at high intensity | Short thermal increase of high intensity | Keyboard/ Keyboard Palm Rest |
| Player avatar moves into water | Water splash image | Short, loud audio spike in water splash audio wave pattern | Multiple, short movement pulses at low intensity | Long thermal decrease of high intensity | Keyboard/ Keyboard Palm Rest |
| Player avatar takes damage | Single, flash burst at enemy avatar and large flash burst near player avatar or blood splatter image | Short, loud audio spike in blood splatter audio wave pattern | Single, long pulse of movement at high intensity | Long thermal increase of high intensity | Keyboard/ Keyboard Palm Rest |
| Enemy avatar takes damage | Single, large flash burst at player avatar and flash burst at enemy avatar | Short soft audio spike in gun audio wave pattern | Three sets of short movement pulses at high intensity | Short thermal decrease of high intensity | Headset |

In some embodiments, haptic zone 251 of the haptic palm rest or other input/output device may have a single piezo electric haptic actuator to form a single haptic region or may be split into two or more haptic regions (e.g., 251a and 251b) within haptic zone 251 with plural piezo electric actuators. Embodiments described below discuss an embodiment with plural haptic regions within a haptic zone on a keyboard, keyboard palm rest, mouse, headset, or other input/output devices. Embodiments may include, for example, haptic keys of a keyboard or sets of haptic keys as additional haptic regions. The haptic peripheral device ecosystem coordination system may transmit this haptic command to a keyboard controller operably connected to the keyboard main printed circuit board assembly 240 in an embodiment. In other embodiments, one or more controllers may be used to receive haptic commands for the haptic palm rest in the keyboard main printed circuit board assembly 240. Any combination of controllers is contemplated in various embodiments as needed.

Each of the piezoelectric actuators (e.g., 234 and 236) situated beneath the palm rest top cover 250 in an embodiment may execute haptic movement independently from one another, pursuant to electrical charges delivered via the keyboard main printed circuit board assembly 240. For example, upon receipt of the haptic command specifically identifying the left palm rest haptic zone 251 in an embodiment, the keyboard controller may transmit an electrical charge through a matrix circuit incorporated within the keyboard main printed circuit board assembly 240 to the palm rest printed circuit board assembly 242 to either piezo actuator 234 or 236 for haptic feedback to a user's left palm. If a haptic response to a left haptic region 251a of haptic zone 251 is required, an electrical charge is sent to piezoelectric actuator 234. The piezoelectric actuator 234 in such an embodiment may then receive the electrical charge from the palm rest printed circuit board assembly 242. Upon application of the electrical charge to the piezoelectric actuator 234 by the keyboard controller, a ceramic disc within the piezoelectric actuator 234 may be mechanically stretched or compressed so as to create a tactile haptic movement event such as the piezoelectric actuator warping up or down and returning to its pre-deformed state in a clicking, bumping, vibrating, or other manner of mechanical movement of varying intensities, durations, or patterns. This may cause the haptic movement 203 of the palm rest top cover 250, at haptic region 251a, felt by the left hand of the user laying atop or in close contact with the palm rest top cover 250. The haptic command received by the keyboard controller in an embodiment may identify various electrical charge magnitudes or haptic movement types to apply to the piezoelectric actuator 234, and in varying pulse patterns.

If a haptic response to a right haptic region 251b of haptic zone 251 is required, an electrical charge is sent to piezoelectric actuator 236. The piezoelectric actuator 236 in such an embodiment may then receive the electrical charge from the palm rest printed circuit board assembly 242. Upon application of the electrical charge to the piezoelectric actuator 236 by the keyboard controller, a ceramic disc within the piezoelectric actuator 236 may be mechanically stretched or compressed so as to create a tactile haptic movement event such as the piezoelectric actuator warping up or down and returning to its pre-deformed state in a clicking, bumping, vibrating, or other manner of mechanical movement of varying intensities, durations, or patterns. This may cause the haptic movement 204 of the palm rest top cover 250, at haptic region 251b, felt by the left hand of the user laying atop or in close contact with the palm rest top cover 250. The haptic command received by the keyboard controller in an embodiment may identify various electrical charge magnitudes or haptic movement types to apply to the piezoelectric actuator 236, and in varying pulse patterns.

Thermo-haptic feedback comprising a change in surface temperature at the palm rest top cover 250 may be provided via one or more TEG arrays situated across the width of the palm rest of a thermo-haptic keyboard and palm rest assembly 200 in some embodiments. For example, a left or first TEG array 270-1 and second, or right TEG array 270-2 may be incorporated within the palm rest of the thermo-haptic keyboard and palm rest assembly in an embodiment. On the right side of palm rest (not shown due to cut-away) additional TEG arrays may be disposed (e.g., third and fourth TEG arrays) for a user's right hand in some embodiments.

As described herein, the keyboard main printed circuit board assembly 240 may receive a haptic command from the haptic peripheral device ecosystem coordination system identifying a specific haptic zone 251 of a palm rest at which a thermo-haptic feedback should occur, upon detection of an occurrence of a specific gaming action event within a virtual 3D gaming environment. In some embodiments, haptic zone 251 may have a single TEG array to form a single haptic region or may be split into two or more haptic regions (e.g., 251a and 251b) within haptic zone 251 with plural TEG arrays.

Each of the TEG arrays (e.g., 270-1 and 270-2) situated beneath the palm rest top cover 250 in an embodiment may execute changes in temperature independently from one another, pursuant to electrical charges delivered via the keyboard main printed circuit board assembly 240. For example, upon receipt of the haptic command specifically identifying the left palm rest haptic zone 251 in an embodiment, the keyboard controller may transmit an electrical charge through a matrix circuit incorporated within the keyboard main printed circuit board assembly 240 to the palm rest printed circuit board assembly 242 to either TEG array 270-1 or 270-2 for thermo-haptic feedback to a user's left palm. If a thermo-haptic response to a left haptic region 251a of haptic zone 251 is required, an electrical charge is sent to TEG array 270-1. The TEG array 270-1 in such an embodiment may then receive the electrical charge from the palm rest printed circuit board assembly 242. Upon application of the electrical charge to either a p-doped or n-doped semiconductor pair of the TEG array 270-1 by the keyboard controller, a thermoelectric effect may either chill or heat an electric insulator within the TEG array 270-1. The degree of temperature increase or decrease at the electric insulator of the TEG array 270-1 in an embodiment may depend upon a magnitude of voltage so applied by the keyboard controller in an embodiment. This may cause an increase or decrease in temperature of the palm rest top cover 250, at haptic region 251a, felt by the left hand of the user laying atop or in close contact with the palm rest top cover 250.

If a thermo-haptic response to a left haptic region 251b of haptic zone 251 is required, an electrical charge is sent to TEG array 270-2. The TEG array 270-2 in such an embodiment may then receive the electrical charge from the palm rest printed circuit board assembly 242. Upon application of the electrical charge to either a p-doped or n-doped semiconductor pair of the TEG array 270-2 by the keyboard controller, a thermoelectric effect may either chill or heat an electric insulator within the TEG array 270-2. The degree of temperature increase or decrease at the electric insulator of the TEG array 270-2 in an embodiment may depend upon a magnitude of voltage so applied by the keyboard controller in an embodiment. This may cause an increase or decrease in temperature of the palm rest top cover 250, at haptic region 251b, felt by the left hand of the user laying atop or in close contact with the palm rest top cover 250. In example embodiments, thermo-haptic feedback may be rendered between left haptic region 251a and right haptic region 251b, between haptic zones such as 251 and other haptic zones or among various input/output devices based on location or type of gaming action event.

Figure 3:
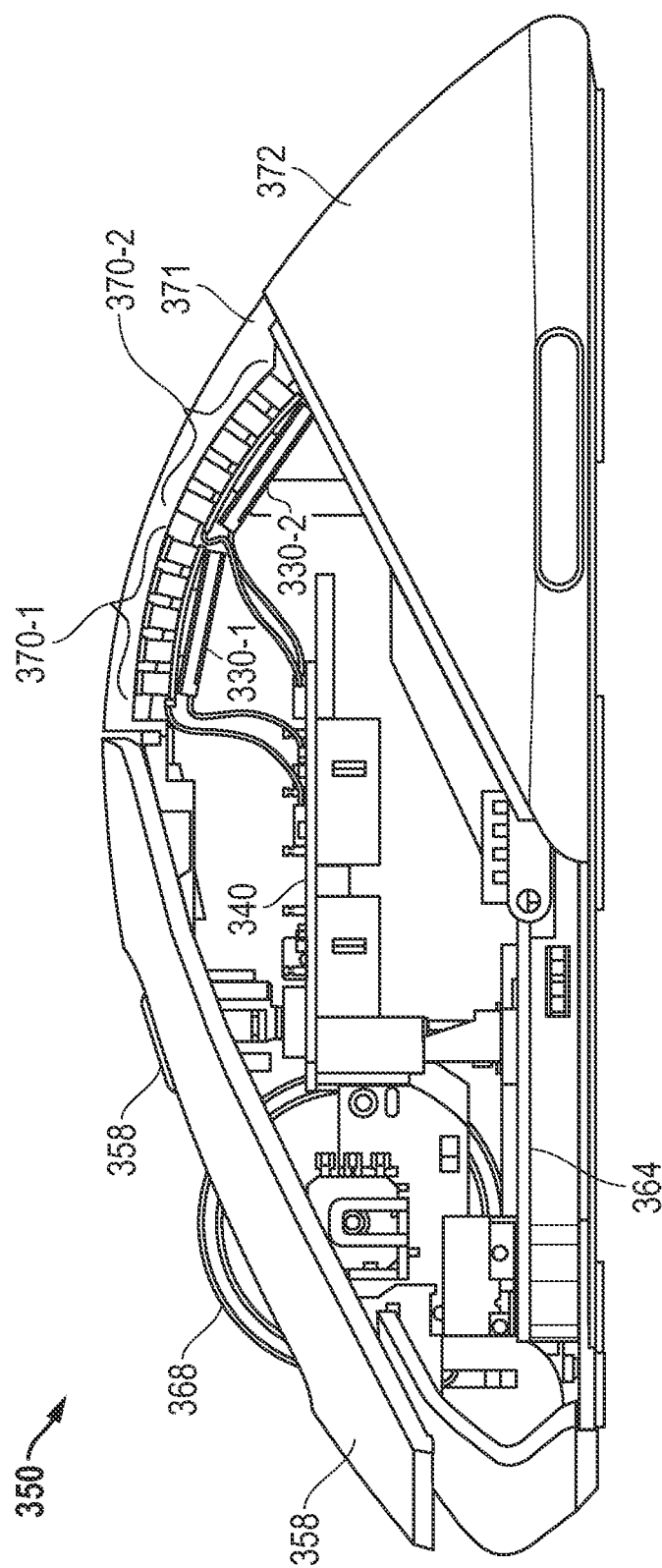
FIG. 3 is a perspective, cut-away view of a haptic feedback mouse according to an embodiment of the present disclosure.

FIG. 3 is a perspective view of a haptic feedback mouse, including designated areas for haptic movement or haptic thermal changes according to an embodiment of the present disclosure. FIG. 3 shows only a portion of the housing 371, 372 of the thermo-haptic mouse 350 being removed to show the interior portions of the thermo-haptic mouse 350. The removed portions of the housing 371, 372 shown in FIG. 3 may include a portion of a mouse bottom and side housing 372 or a portion of a mouse palm rest housing 371. The thermo-haptic mouse 350 may be operatively coupled to an information handling system (not shown) by either a wired or wireless connection. Where the thermo-haptic mouse 350 is operatively coupled to an information handling system via a wired connection, the thermo-haptic mouse 350 may include a signal and power line operatively coupled to a roller/LED PCB 364. The wired connection to the roller/LED PCB 364 may provide the signal data from the processor of the information handling system as well as a voltage from, for example, a PMU at the information handling system. Where the thermo-haptic mouse 350 is operatively coupled to the information handling system via a wireless connection, the roller/LED PCB 364 may include a transceiver used to transmit and receive data to and from the information handling system. In this embodiment, the thermo-haptic mouse 350 may further include a stand-alone power source such as a battery (e.g., lithium ion rechargeable battery).

In the embodiment shown in FIG. 3, the thermo-haptic mouse 350 may include a first PCB such as the roller/LED PCB 364 and a second PCB such as PCB 340. The roller/LED PCB 364 may include circuitry used to receive input from one or more buttons 358 and a scrolling wheel 368 used by the user to provide input to the information handling system. Additional buttons may also be arranged for convenience to the user along the surface of the thermo-haptic mouse 350 such as one or more side buttons (not shown). The roller/LED PCB 364 of the thermo-haptic mouse 350 may also include circuitry associated with a position- and movement-detection system. The circuitry for both the motion sensor and optical driver (or other type of acceleration and position sensor such as a roller) may be placed on the roller/LED PCB 364.

The roller/LED PCB 364 may, in an embodiment, also house a mouse controller that is used to receive input from the actuation of the buttons 358, scrolling wheel 368, the motion sensor, and the optical driver. This data received by the mouse controller may be processed into input data used by the information handling system to interact with a graphical user interface at the information handling system. In the context of the present specification, the input data provided by the mouse controller may be used to control an action within a gaming environment during execution of a gaming application. By way of example, the input data from the mouse controller to the processor of the information handling system may be interpreted by the processor to control a cursor on the video/graphics display device, control movement of an avatar within a gaming environment, or otherwise initiate a gaming action during game play.

The thermo-haptic mouse 350 may also include a dedicated PCB 340 that is operatively coupled to the roller/LED PCB 364 and the mouse controller in an embodiment. The dedicated PCB 340 may include circuitry associated with any TEG driver and PEA driver as well as connection ports used to operatively couple the first TEG array 370-1, the second TEG array 370-2, the first PEA 330-1, and the second PEA 330-2 in the embodiment in FIG. 3. Although FIG. 3 shows the roller/LED PCB 364 and dedicated PCB 340 as two separate PCBs, the present specification contemplates that these two PCBs may be combined to reduce a footprint within the thermo-haptic mouse 350. In an embodiment, either of the roller/LED PCB 364 and dedicated PCB 340 may be divided into a further number of PCBs in order to better arrange of circuitry within the thermo-haptic mouse 350.

FIG. 3 also shows a specific arrangement of the first TEG array 370-1, second TEG array 370-2, first PEA 330-1, and second PEA 330-2 relative to each other. Although FIG. 3 shows only two TEG arrays and two PEAs, the present specification contemplates that any number of TEG arrays and PEAs may be placed within the housing of the thermo-haptic mouse 350 and against an inner surface of the housing 371, 372 of the thermo-haptic mouse 350. The location of the TEG arrays and PEAs may also vary. In an embodiment, one or more TEG arrays and/or PEAs may be placed underneath a button 358, along a side of the thermo-haptic mouse 350, or at any other location where a user may touch, even temporarily, the thermo-haptic mouse 350.

As described herein either of the first TEG array 370-1 and second TEG array 370-2 may include an array of p-doped and n-doped semiconductor pairs. The first TEG array 370-1 and second TEG array 370-2 shown in FIG. 3 may each be addressed by the mouse controller individually so that each of the first TEG array 370-1 and second TEG array 370-2 may be activated individually. The p-doped and n-doped semiconductor pairs may be sandwiched between a top electric insulator and bottom electric insulator both made of, for example, a ceramic. The second TEG array 370-2 in FIG. 3 is shown to not include these ceramic insulators for ease of illustration. However, it is intended that second TEG array 370-2 or any other TEG array placed within the thermo-haptic mouse 350 includes those ceramic electric insulators as that shown in the first TEG array 370-1 of FIG. 3.

The p-doped and n-doped semiconductor pairs, in the present specification, may each be considered a TEG in its own and each of the first TEG array 370-1 and second TEG array 370-2 may be referred herein as an array of TEGs. In an embodiment, each of the p-doped and n-doped semiconductor pairs as a single TEG may be addressed individually so that each of the TEGs may provide specific haptic feedback to the user in some embodiments. In a specific example, neighboring TEG arrays may be concurrently, sequentially, or otherwise activated to either heat or cool the housing 371, 372 of the thermo-haptic mouse 350. This selective activation of each of the TEG arrays may, to the perspective of the user, feel like a heat wave or cold wave has passed across the outer surface of the thermo-haptic mouse 350 based on rendering of haptic instructions received. In an embodiment, multiple TEG arrays may be used to define specific zones on the thermo-haptic mouse 350 and may be activated by the mouse controller in order to provide that thermo-haptic feedback rendered based on location or type of gaming action event. Again, the detected signals by the processor of the information handling system such as those shown in Table 1 may be used to provide specific TEG array behavior and this embodiment incorporates the use of those types of detected signals among others.

In an embodiment, the first TEG array 370-1 or second TEG array 370-2 may include a plurality of p-doped and n-doped semiconductor pairs that are activated together to heat or cool the housing 371, 372 of the thermo-haptic mouse 350. In an embodiment, the first TEG array 370-1 and second TEG array 370-2 may be independently activated at different times to provide a specific haptic feedback to the user. In an embodiment, in order to increase the number of zones that may independently heated or cooled, the number of TEG arrays 370-1, 370-2 placed across an interior surface of the housing 371, 372 may be increased. In this embodiment, the number of connectors to and from the TEG arrays 370-1, 370-2 may increase as the number of TEG arrays 370-1, 370-2 increases and the dedicated PCB 340 may incorporate these other connectors. In an embodiment, each of the TEG arrays 370-1, 370-2 may include a first lead operatively coupling the TEG arrays 370-1, 370-2 to the dedicated PCB 340 via a first connector. Additionally, in this embodiment, each of the TEG arrays 370-1, 370-2 may include a second lead operatively coupling the TEG arrays 370-1, 370-2 via another connector. The connectors in these embodiments may be operatively coupled to a TEG driver and the mouse controller as described herein. In these embodiments, the first lead and second lead may be used to provide a specific amount of voltage at a specific polarity across the TEGs within the TEG array in order to cause one of a heated or cooled effect at the first TEG array 370-1 and second TEG array 370-2.

As shown in FIG. 3, the thermo-haptic mouse 350 also includes a first PEA 330-1 and a second PEA 330-2. Again, the number of PEAs placed within the housing of the thermo-haptic mouse 350 may be more or less than two and the present specification contemplates these additional embodiments. Much like the TEG arrays 370-1, 370-2, the PEAs 330-1, 330-2 may be arranged so that they may impart a vibration, click, or other mechanical effect on the housing 371, 372 of the thermo-haptic mouse 350 in order to provide another different kind of haptic feedback to the user. Again, the detected signals by the processor of the information handling system such as those described with reference to TABLE 1 may be used to render specific PEA behavior and this embodiment incorporates the use of those types of detected signals among others in order to provide specific haptic feedback to the user, based on type or location of gaming action events, gaming environment, or the like.

In the embodiment shown in FIG. 3, a first PEA 330-1 has been placed behind the first TEG array 370-1 such that the first TEG array 370-1 is sandwiched between the first PEA 330-1 and an interior surface of the housing 371, 372 of the thermo-haptic mouse 350. In this arrangement the first PEA 330-1 can impart a vibration against the first TEG array 370-1 and the housing 371, 372 when activated. Activation of the first PEA 330-1 (and second PEA 330-2) may be accomplished when the mouse controller receives signals to activate the first PEA 330-1 and sends a voltage to piezoelectric material layer causing the piezoelectric material to expand. When the voltage is removed, the piezoelectric material shrinks back to its rest state. This expansion and contraction of the piezoelectric material upon selective application of the voltage creates a vibration, click, or other mechanical effect that is felt by a user at a location on the surface of the housing 371, 372.

In an embodiment, a first PEA 330-1 and first TEG array 370-1 pair may be described herein as a thermo-haptic module. Multiple thermo-haptic modules (e.g., second TEG array 370-2 with a second PEA 330-2) may be arranged anywhere within the housing 371, 372 and along an interior wall of the housing 371, 372. Again, in order to increase the granularity of haptic feedback felt by the user, the number of thermo-haptic modules may be increased creating more zones along the surface of the housing 371, 372.

In an embodiment, the thermo-haptic module including a TEG array 370-1, 370-2 and a PEA 330-1, 330-2 may be arranged along an interior surface of the mouse palm rest housing 371 where a user's palm is meant to rest. This may be one of many locations where these thermo-haptic modules may be placed and includes sufficient surface area to create multiple thermo-haptic feedback zones that can be detected by the user during operation of the thermo-haptic mouse 350. Additional locations may also include a button location and side locations where the thermo-haptic modules may be placed to impart the thermo-haptic feedback to a user.

Figure 4:
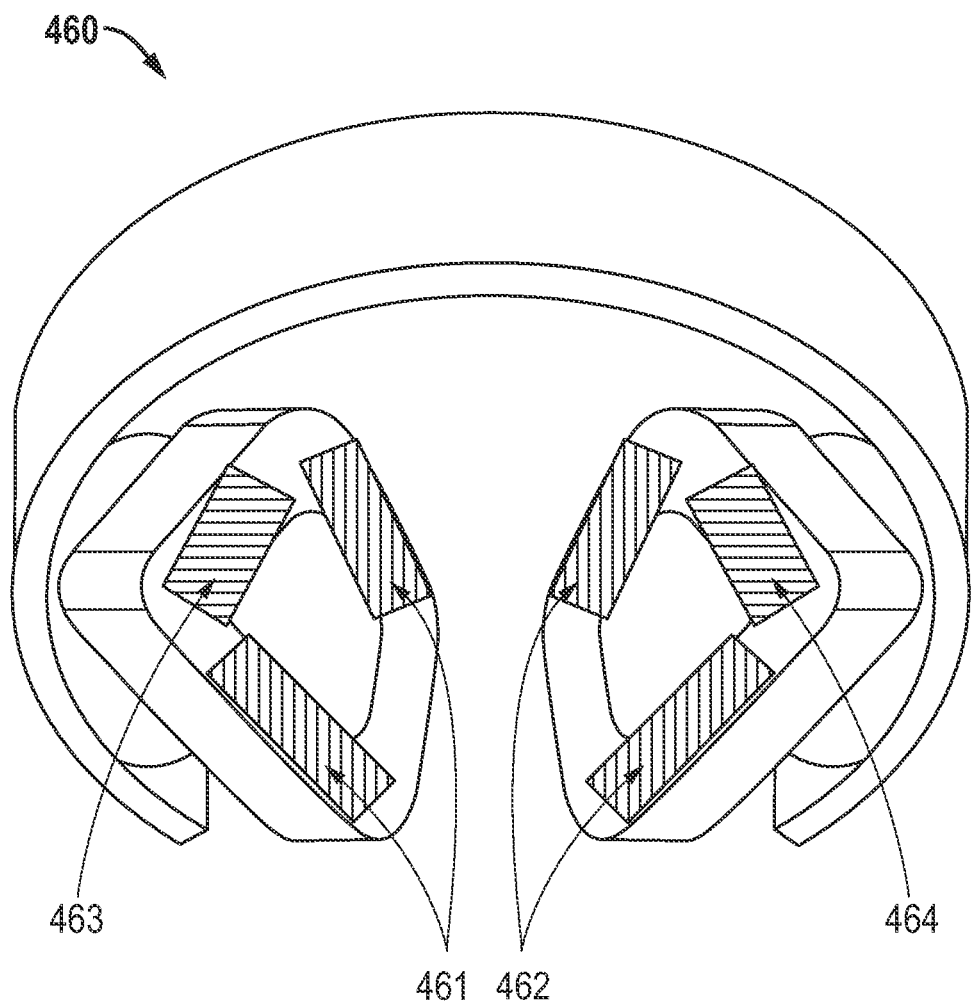
FIG. 4 is a perspective view of a haptic feedback audio headset according to an embodiment of the present disclosure.

FIG. 4 is a perspective view of a haptic feedback audio headset, including designated areas for haptic movement or haptic thermal changes according to an embodiment of the present disclosure. As described herein, piezoelectric actuators (PEAs) and thermoelectric generation (TEG) arrays situated within a thermo-haptic headset 460 may provide thermo-haptic feedback in various regions of the thermo-haptic headset 460 in embodiments described herein. A haptic command transmitted by the haptic peripheral device ecosystem coordination system to a headset controller in an embodiment may initiate thermo-haptic feedback of a haptic region of the thermo-haptic headset 460, that correlates to a type or location of gaming action event detected as having occurred in live gameplay. The thermo-haptic feedback initiated by the headset controller and rendered from the haptic peripheral device ecosystem coordination system in such a way may prompt a haptic movement (e.g., click, bump, vibration, or other mechanical movement) or a thermal change to occur within the haptic regions, so as to be felt by the user of the thermo-haptic headset 460, who may be in close contact with the identified haptic region.

Thermo-haptic feedback comprising haptic movement may be provided via one or more piezoelectric actuators situated beneath the surface of various portions of a thermo-haptic headset 460 in some embodiments. For example, a thermo-haptic headset 460 in an embodiment may include earphones designed to come into contact with a portion of the user's ears or portions of the user's head surrounding the ears. A headset printed circuit board assembly and a plurality of piezoelectric actuators may be incorporated within the one or more portions of these earphones of the thermo-haptic headset 460 in an embodiment.

A headset printed circuit board assembly may receive a haptic command from the haptic peripheral device ecosystem coordination system, via a headset controller in an embodiment, as described in greater detail with respect to FIG. 1. For example, in an embodiment, the haptic peripheral device ecosystem coordination system may generate a haptic command to be rendered at a headset haptic region 461, 462, 463, or 464, upon detecting occurrence of a specific gaming action event within a virtual 3D gaming environment displayed via a video display of the information handling system (e.g., information handling system 100 described with reference to FIG. 1). The rendered haptic command may be directed to an identification of a specific haptic zone, such as the headset left haptic movement region 463, the headset left haptic thermal regions 461, the headset right haptic thermal regions 462, or the headset right haptic movement region 464, at which a thermo-haptic feedback should occur. In another embodiment, each of the headset haptic regions (e.g., 461, 462, 463, or 464) may provide both haptic movement and haptic thermal feedback. The headset haptic region (e.g., 461, 462, 463, or 464) at which a haptic command may be rendered in an embodiment may be correlated to the type of gaming action event identified, based on a visual action event indicator, an audio action event indicator, a gaming code instruction, or a combination, as described in greater detail with respect to TABLE 1. The haptic peripheral device ecosystem coordination system may transmit this haptic command to a headset controller operably connected to the headset printed circuit board assembly in an embodiment.

Each of the piezoelectric actuators situated beneath the haptic movement regions (e.g., 461, 462, 463, or 464) of the headset 460 in an embodiment may execute haptic movement independently from one another, pursuant to electrical charges delivered via the headset printed circuit board assembly. For example, upon receipt of the haptic command specifically identifying the headset left haptic movement region 463 in an embodiment, the headset controller may transmit an electrical charge through a matrix circuit incorporated within the headset printed circuit board assembly to a piezo actuator disposed beneath the surface of the headset 460 within the headset left haptic movement region 463 for haptic feedback to a user's left ear or left side of the head. Upon application of the electrical charge to the piezoelectric actuator disposed beneath the surface of the headset 460 within the headset left haptic movement region 463 by the headset controller, a ceramic disc within the piezoelectric actuator may be mechanically stretched or compressed so as to create a tactile haptic movement event such as the piezoelectric actuator warping up or down and returning to its pre-deformed state in a clicking, bumping, vibrating, or other manner of mechanical movement of varying intensities, durations, or patterns. This may cause haptic movement of the surface of the headset 460 within the headset left haptic movement region 463, felt by the left ear or left side of the head of the user in close contact with the surface of the headset 460 within the headset left haptic movement region 463. The haptic command received by the headset controller in an embodiment may identify various electrical charge magnitudes or haptic movement types to apply to the piezoelectric actuator, and in varying pulse patterns.

As another example, upon receipt of the haptic command specifically identifying the headset right haptic movement region 464 in an embodiment, the headset controller may transmit an electrical charge through a matrix circuit incorporated within the headset printed circuit board assembly to a piezo actuator disposed beneath the surface of the headset 460 within the headset left haptic movement region 464 for haptic feedback to a user's right ear or right side of the head. Upon application of the electrical charge to the piezoelectric actuator disposed beneath the surface of the headset 460 within the headset right haptic movement region 464 by the headset controller, a ceramic disc within the piezoelectric actuator may be mechanically stretched or compressed so as to create a tactile haptic movement event such as the piezoelectric actuator warping up or down and returning to its pre-deformed state in a clicking, bumping, vibrating, or other manner of mechanical movement of varying intensities, durations, or patterns. This may cause haptic movement of the surface of the headset 460 within the headset right haptic movement region 464, felt by the right ear or right side of the head of the user in close contact with the surface of the headset 460 within the headset right haptic movement region 464.

Thermo-haptic feedback comprising a change in surface temperature at tone or more headset haptic thermal regions (e.g., 461, 462, 463, or 464) may be provided via one or more TEG arrays disposed beneath the surface of the headset 460 in some embodiments. As described herein, a headset printed circuit board assembly may receive a haptic command from the haptic peripheral device ecosystem coordination system identifying a specific haptic region (e.g., 461, 462, 463, or 464) of a headset at which a thermo-haptic feedback should occur, upon detection of an occurrence of a specific gaming action event within a virtual 3D gaming environment and rendered to that specific haptic region (e.g., 461, 462, 463, or 464) by the haptic peripheral device ecosystem coordination system.

Each of the TEG arrays situated beneath the earphones of the headset 460 in an embodiment may execute changes in temperature independently from one another, pursuant to electrical charges delivered via the headset printed circuit board assembly. For example, upon receipt of the haptic command specifically identifying the headset left haptic thermal region 461 in an embodiment, the headset controller may transmit an electrical charge through a matrix circuit incorporated within the headset printed circuit board assembly to a TEG array disposed beneath the surface of the headset 460 within the headset left haptic thermal region 461 for haptic feedback to a user's left ear or left side of the head. Upon application of the electrical charge to the TEG array disposed beneath the surface of the headset 460 within the headset left haptic thermal region 461 by the headset controller to either a p-doped or n-doped semiconductor pair of the TEG array disposed beneath the surface of the headset 460 within the headset left haptic thermal region 461 by the headset controller, a thermoelectric effect may either chill or heat an electric insulator within the TEG array disposed beneath the surface of the headset 460 within the headset left haptic thermal region 461. The degree of temperature increase or decrease at the electric insulator of the TEG array in an embodiment may depend upon a magnitude of voltage so applied by the keyboard controller in an embodiment. This may cause an increase or decrease in temperature of the surface of the headset 460 within the headset left haptic thermal region 461, felt by the left ear or left side of the head of the user in close contact with the headset 460.

As another example, upon receipt of the haptic command specifically identifying the headset right haptic thermal region 462 in an embodiment, the headset controller may transmit an electrical charge through a matrix circuit incorporated within the headset printed circuit board assembly to a TEG array disposed beneath the surface of the headset 460 within the headset right haptic thermal region 462 for haptic feedback to a user's right ear or right side of the head. Upon application of the electrical charge to the TEG array disposed beneath the surface of the headset 460 within the headset right haptic thermal region 462 by the headset controller to either a p-doped or n-doped semiconductor pair of the TEG array disposed beneath the surface of the headset 460 within the headset right haptic thermal region 462 by the headset controller, a thermoelectric effect may either chill or heat an electric insulator within the TEG array disposed beneath the surface of the headset 460 within the headset right haptic thermal region 462. The degree of temperature increase or decrease at the electric insulator of the TEG array in an embodiment may depend upon a magnitude of voltage so applied by the keyboard controller in an embodiment. This may cause an increase or decrease in temperature of the surface of the headset 460 within the headset right haptic thermal region 462, felt by the right ear or right side of the head of the user in close contact with the headset 460.

Figure 5:
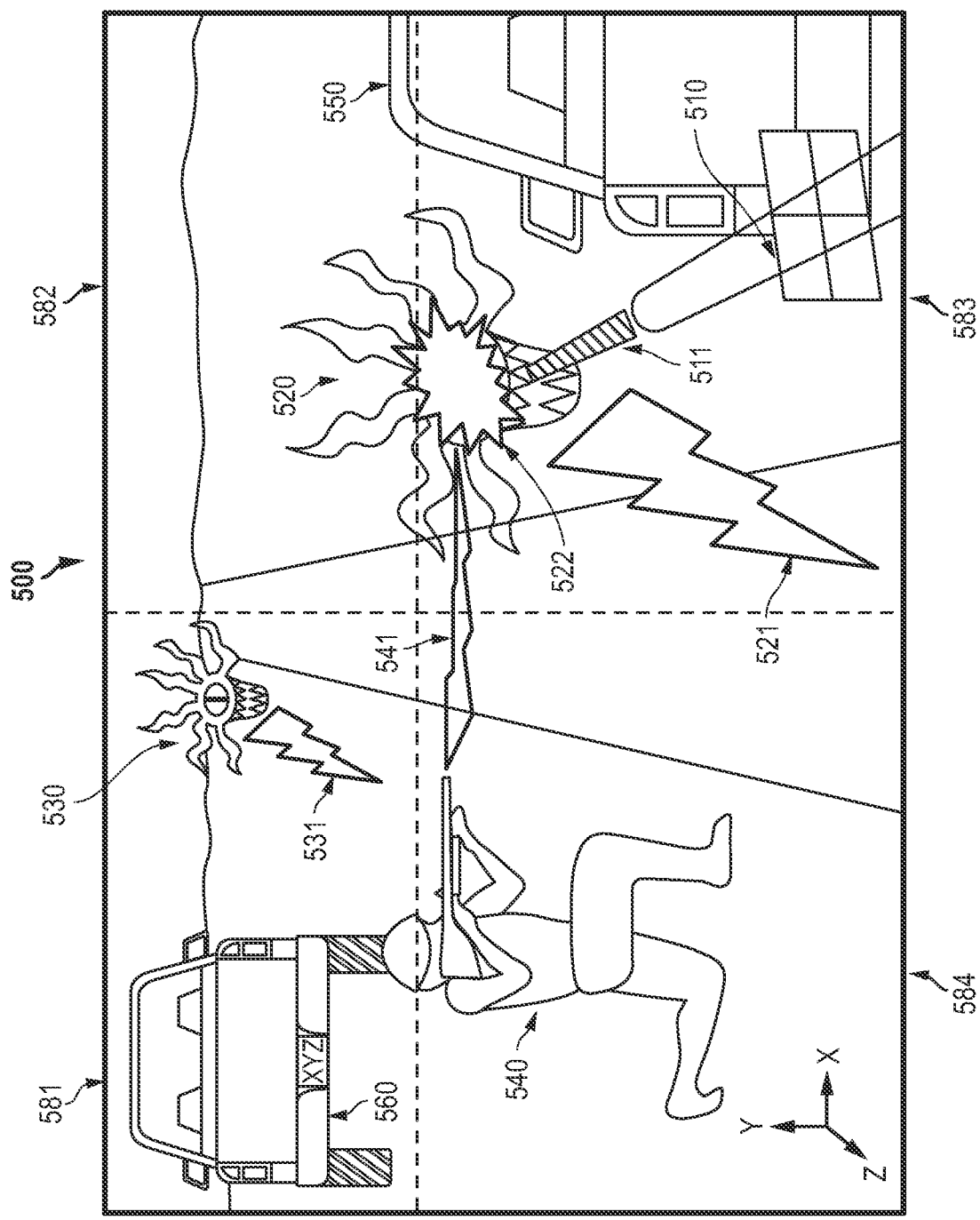
FIG. 5 is an image of three-dimensional gaming environment in which gaming action events may occur according to an embodiment of the present disclosure.

FIG. 5 is an image of three-dimensional gaming environment 500 in which gaming action events associated with a plurality of thermo-haptic feedbacks may occur according to an embodiment of the present disclosure. Such a three-dimensional gaming environment 500 in an embodiment may display a player avatar 510 (often represented by a weapon held by the avatar) performing actions (e.g., firing a weapon or performing some other player attack action event 511) pursuant to user instructions input via the keyboard or mouse. One or more non-player avatars may also be displayed within the three-dimensional gaming environment 500, such as an enemy avatar (e.g., 520, or 530), or an ally avatar 540. The actions of the enemy avatar (e.g., 520 or 530) in an embodiment may be controlled by the gaming application in some embodiments. In other embodiments, the actions of the enemy avatar (e.g., 520 or 530), as well as the actions of the ally avatar 540 may be controlled by input received from other users (e.g., not the user of the thermo-haptic keyboard and palm rest assembly described herein) in communication with the gaming application via a network. The three-dimensional gaming environment 500 may further include inanimate objects such as buildings, weapons, non-interactive characters, or vehicles (e.g., 550 and 560).

Each of the avatars and objects may be displayed within the three-dimensional gaming environment 500 at a specific location (e.g., orientation and depth, or Euclidian coordinates (X, Y, Z)) with respect to the player avatar 510. One or more of the avatars may be involved in some sort of gaming action event in an embodiment, such as firing a weapon or performing some other form of attack, and receiving damage from such an attack. For example, the player avatar 510 may perform a player attack gaming action event 511, displayed as a specifically colored ejection 511 leaving the player avatar's weapon 510 (e.g., emulating gun fire). As another example, the enemy avatar 520 may initiate an enemy attack gaming action event 521 on the player's avatar, displayed as a bright pulse emulating bolt of electricity. In still other examples, another enemy avatar 530 may initiate an enemy avatar attack gaming action event 531 on a non-player or ally avatar 540, or the non-player or ally avatar 540 may initiate an ally attack gaming action event 541 on the enemy avatar 520. In some embodiments, a gaming action event may occur when an avatar (e.g., player, ally, or enemy) takes damage from an incoming attack. For example, either the ally avatar attack 541 or the player avatar attack 511 may cause the enemy avatar 520 to incur a damage gaming action event 522. These are only examples of gaming action events that may occur within gameplay, and are meant to be illustrative rather than restrictive. Other gaming action events may include any action allowable by any avatar or character within a gaming application, including wielding of any weapon, initiation of conversation, casting of a spell, use of a telekinetic power, entering water or other liquid, etc.

As described herein, the haptic peripheral device ecosystem coordination system in an embodiment may identify gameplay action events occurring within the three-dimensional gaming environment 500 using a plurality of different methods, including, for example, a trained image recognition model. In such an embodiment, the haptic peripheral device ecosystem coordination system may capture a plurality of images, such as the image shown in FIG. 5, of gameplay during a training period. These training period captured images may include images of various avatars (e.g., 510, 520, 530, or 540) displayed at varying depths and viewing angles with respect to the player's perspective. The avatars may be performing or affected by a variety of gaming action events (e.g., 511, 521, 522, 531, or 541). The various avatars (e.g., 510, 520, 530, or 540), which may also include an avatar 510 of the user/player herself, as well as the gaming action events (e.g., 511, 521, 522, 531, or 541) within each of these captured training images may be labeled to form a training dataset for an image recognition model.

These labeled, captured training images may then be input into an image recognition model in order to train the model to accurately identify the avatars (e.g., 510, 520, 530, or 540) and gaming action events (e.g., 511, 521, 522, 531, or 541) within the captured training images. The image recognition model may be trained repeatedly on a plurality of such training datasets until the model can accurately make such identifications within a preset tolerance (e.g., 70% of the time or greater). Once the model is trained in such embodiments, captured images of live gameplay (e.g., images that have not yet been labeled to identify avatars or gaming action events) may by input into the trained image recognition model, which may then identify an avatar (e.g., 510, 520, 530, or 540), avatar location, and gaming action events (e.g., 511, 521, 522, 531, or 541) occurring within live gameplay as it is displayed via the video display. If the identified gaming action event (e.g., 511, 521, 522, 531, or 541) is associated with a thermo-haptic feedback (e.g., haptic movement or change in temperature at one or more haptic regions of one or more thermo-haptic input/output peripheral devices), the haptic peripheral device ecosystem coordination system may transmit a haptic command to a controller of the thermo-haptic input/output peripheral device to initiate thermo-haptic feedback within a haptic region of the thermo-haptic input/output peripheral device (e.g., thermo-haptic keyboard palm rest, thermo-haptic mouse, or thermo-haptic headset device).

In another embodiment described herein, the haptic peripheral device ecosystem coordination system may identify such live gaming action events (e.g., 511, 521, 522, 531, or 541) by analyzing shifts in pixel brightness detected by firmware for the video display device. In many gaming scenarios, damage to the player avatar or a non-player game character avatar (e.g., enemy or ally) may be accompanied by a bright occurrence (e.g., 511, 521, 522, 531, or 541) such as a weapon firing or an explosion occurring. Firmware for the video display device in an embodiment may measure these changes in brightness, their size, location, and speed in real-time during live gameplay. Such firmware real-time analysis methods exist in the art in order to record the lag between a player inputting a user instruction (e.g., fire weapon) and display of the player avatar 510 taking the action 511 pursuant to such received user instruction, for example. The haptic peripheral device ecosystem coordination system in an embodiment may access these real-time pixel brightness measurements in some embodiments described herein to determine when a gaming action event has occurred (e.g., an avatar 510 firing a weapon 511, performing another type of attack, taking damage), and the location (e.g., depth and angle with respect to the player) of the gaming action event (e.g., 511) as the gaming action event occurs during live gameplay.

In yet another embodiment, the gaming application itself may generate instructions or indicators identifying occurrence of a gaming action event within live gameplay, and its location or type. For example, the gaming application generating the three-dimensional gaming environment 500 may be pre-programmed to transmit an indication that a specific gaming action event has occurred to the haptic peripheral device ecosystem coordination system. In such an embodiment, the haptic peripheral device ecosystem coordination system may then identify a haptic region within one or more of the peripheral devices of the ecosystem of peripheral devices associated (e.g., within TABLE 1) with the gaming action event identified in the instruction or indicator received from the gaming application. The haptic peripheral device ecosystem coordination system in such an embodiment may then transmit a haptic command to render the haptic feedback so identified (e.g., with reference to TABLE 1) to the associated haptic region of the peripheral device. In still another embodiment, the gaming application may be pre-programmed to identify a haptic region within one or more of the peripheral devices of the ecosystem of peripheral devices associated (e.g., within TABLE 1) with the gaming action event and to instruct the peripheral device driver to render that haptic feedback to the associated haptic region of the peripheral device.

The position or location of the gaming action event within the displayed image of 3D gaming environment 500 may inform the type of gaming action event detected. For example, the displayed image may be separated into four quadrants, including an upper-left quadrant 581, an upper-right quadrant 582, a lower-right quadrant 583, and a lower-left quadrant 584. In first-person shooter games, the player avatar's weapon 510 may be routinely displayed within the lower-right quadrant 583, such that bright flashes or image-recognized gaming action events within this lower-right quadrant 583 may most likely be associated with the player avatar firing its weapon 511. In another example, gaming action events displayed within the upper-left quadrant 581 and upper-right quadrant 582 in an embodiment may reflect gaming action events occurring at a distance from the player avatar 510, and thus may not be associated with gaming action events caused by user input commands (e.g., player avatar firing weapon 511), or with damage occurring to the player avatar, which may be displayed within the lower right quadrant 583 or lower left quadrant 584.

The haptic feedback associated with an identified gaming action event in an embodiment may initiate haptic movement or thermo-haptic feedback of a portion of an input/output device (e.g., keyboard, keyboard palm rest, haptic mouse, haptic headset) having a position with respect to the user that correlates to the position of the gaming action event (e.g., 511, 521, 522, 531, or 541) with respect to the player's avatar within the virtual three-dimensional gaming environment 500. For example, the gaming action event 511, located in the bottom-right corner of the image of the virtual three-dimensional gaming environment 500 and indicating an event occurring very near or at the player's avatar 510 may be associated with a haptic movement or thermo-haptic feedback within a haptic region toward the right of one or more input/output devices situated closest the user, such as the haptic mouse or the keyboard palm rest. As another example, the gaming action event 531, located in the top-center of the image of the virtual three-dimensional gaming environment 500 and indicating an event occurring relatively far away from the player's avatar 510 may be associated with a haptic movement or thermo-haptic feedback of one or more function or number keys of a keyboard, or the haptic headset.

In some embodiments, the detected gaming action event may be associated with a plurality of haptic regions. For example, the ally attack gaming action event 541 in an embodiment may begin at the ally avatar 540, and move toward the enemy avatar 520. In such an example embodiment, the gaming action event 541 may be associated with a haptic movement or thermo-haptic feedback that begins in a haptic region located to the left of an input/output device (e.g., keyboard, keyboard palm rest, or haptic headset), and proceeds across a plurality of haptic regions in a straight line to the right side of the input/output device. In such a way, the haptic peripheral device ecosystem coordination system may cause haptic feedback in one or more locations across a plurality of input/output devices that reflects the location of the gaming action event 540 within the virtual three-dimensional gaming environment 500. For example, a heat wave or shock wave may be felt at or across one or more keys of a keyboard and may progress to a haptic zone of a keyboard palm rest.

In some embodiments, the haptic peripheral device ecosystem coordination system may further determine whether the avatar is the player avatar (e.g., 510) or a non-player avatar (e.g., 520, 530, or 540). If the identified gaming action event (e.g., player avatar 510 firing a weapon 511) is associated with a thermo-haptic feedback (e.g., haptic movement or change in temperature at one or more haptic regions of one or more thermo-haptic input/output peripheral devices), the haptic peripheral device ecosystem coordination system may transmit a haptic command to a controller of the thermo-haptic input/output peripheral device to initiate thermo-haptic feedback within a haptic region of the thermo-haptic input/output peripheral device (e.g., thermo-haptic keyboard palm rest, thermo-haptic mouse, or thermo-haptic headset device).

Figure 6:
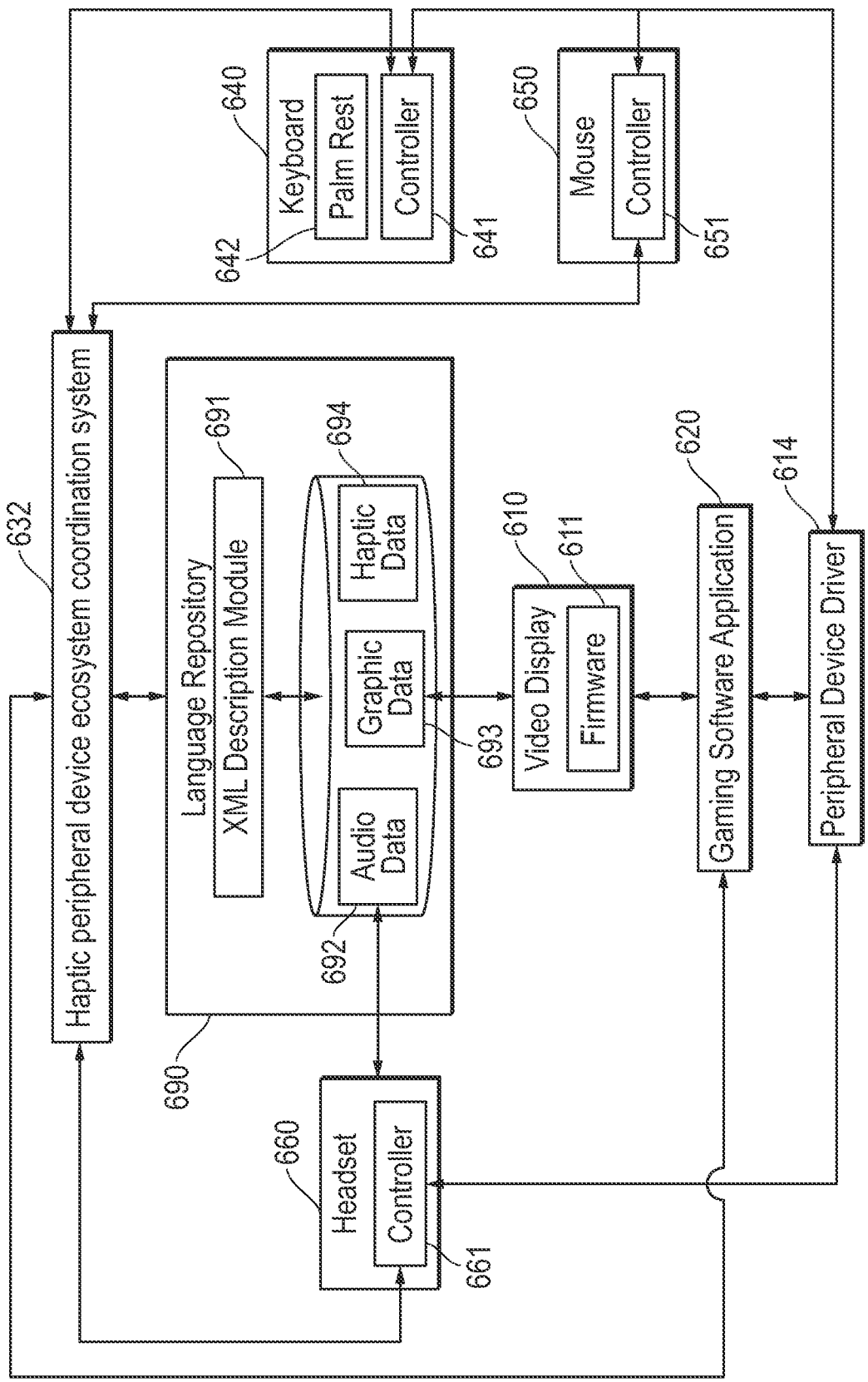
FIG. 6 is a block diagram of a haptic peripheral device ecosystem coordination system according to an embodiment of the present disclosure.

FIG. 6 is a block diagram of a haptic peripheral device ecosystem coordination system coordinating haptic commands across a plurality of peripheral devices according to an embodiment of the present disclosure. As described herein, the haptic peripheral device ecosystem coordination system 632 in an embodiment may coordinate thermo-haptic feedback across a plurality of thermo-haptic input/output peripheral devices, such as a thermo-haptic mouse 650, a thermo-haptic headset 660, or a thermo-haptic keyboard and palm rest assembly 642, based on identified gaming action events occurring within live gameplay of a gaming software application 620. The haptic peripheral device ecosystem coordination system 632 in an embodiment may perform such coordination by determining a visual action event indicator or an audio action event indicator associated with a gaming action event has occurred, or receiving an indication from the gaming application that the gaming action event has occurred, and identifying a haptic movement command or haptic thermal command associated with that gaming action event. The haptic peripheral device ecosystem coordination system 632 in an embodiment may identify a haptic feedback associated with the gaming action event that has just occurred, and render that haptic feedback at one or more input/output devices (e.g., 640, 650, or 660) within an ecosystem of input/output devices with which the user may be in contact. In such an embodiment, the haptic peripheral device ecosystem coordination system 632 may retrieve executable code instructions for such a haptic movement command or haptic thermal command, written in a format executable by one of the plurality of thermo-haptic input/output peripheral devices also associated with the identified gaming action event, from a language repository 690. The haptic peripheral device ecosystem coordination system 632 in an embodiment may transmit such executable code instructions to the identified thermo-haptic input/output peripheral device for execution, causing thermo-haptic feedback indicative of the identified gaming action event to be rendered at that peripheral device.

In an embodiment, the gaming software application 620 may generate instructions or indicators identifying occurrence of a gaming action event within live gameplay, and its location or type. For example, the gaming application 620 generating the three-dimensional gaming environment may be pre-programmed to transmit an indication that a specific gaming action event has occurred to the haptic peripheral device ecosystem coordination system 632. In such an embodiment, the haptic peripheral device ecosystem coordination system 632 may then identify a haptic region within one or more of the peripheral devices (e.g., 640, 650, or 660) of the ecosystem of peripheral devices associated (e.g., within TABLE 1) with the gaming action event identified in the instruction or indicator received from the gaming application 620. The haptic peripheral device ecosystem coordination system in such an embodiment may then transmit a haptic command to render the haptic feedback so identified (e.g., with reference to TABLE 1) to the associated haptic region of the peripheral device (e.g., 640, 650, or 660). In still another embodiment, the gaming application may be pre-programmed to identify a haptic region within one or more of the peripheral devices (e.g., 640, 650, or 660) of the ecosystem of peripheral devices associated (e.g., within TABLE 1) with the gaming action event and to instruct the peripheral device driver 614 to render that haptic feedback to the associated haptic region of the peripheral device (e.g., 640, 650, or 660).

The haptic peripheral device ecosystem coordination system 632 in an embodiment may determine that a visual action event indicator associated with a gaming action event has occurred within live gameplay controller by the gaming software application 620. In an embodiment, the gaming software application 620 may transmit display instructions to a video display 610, which may generate and display images of live gameplay, such as that described with reference to FIG. 5. In an embodiment, the gaming software application 620 may also transmit audio commands or audio signals to the controller 661 of a thermo-haptic headset device 660, which may play the audio signal via one of more speakers incorporated therewithin.

The haptic peripheral device ecosystem coordination system 632 in an embodiment may identify the occurrence of a visual action event indicator associated with a gaming action event via one or more of a plurality of contemplated methods. For example, visual action event indicators may be identified in an embodiment by analysis of captured images of live gameplay by a trained image recognition model or by analysis of pixel brightness during live gameplay to detect the gaming action event occurrence, as described in greater detail with respect to FIG. 8. As another example, the haptic peripheral device ecosystem coordination system 632 in an embodiment may identify visual action event indicators by analyzing shifts in pixel brightness detected by firmware 611 for the video display device 610. In many gaming scenarios, damage to the player avatar or a non-player game character avatar (e.g., enemy or ally) may be accompanied by a bright occurrence such as a weapon firing or an explosion occurring. Firmware 611 for the video display device in an embodiment may measure these changes in brightness, their size, location, and speed in real-time during live gameplay. The firmware 611 in such an embodiment may transmit these measured changes, their size, location, and speed for storage at the graphic data module 693 of a language repository 690 accessible by the haptic peripheral device ecosystem coordination system 632. The haptic peripheral device ecosystem coordination system 632 in an embodiment may access the real-time pixel brightness measurements stored at 693 in some embodiments to determine when a visual action event indicator associated with a gaming action event has occurred (e.g., an avatar firing a weapon, performing another type of attack, taking damage), and the location (e.g., depth and angle with respect to the player) of the visual action event as it occurs during live gameplay, as described in greater detail with respect to FIG. 8. In another embodiment, the gaming application 620 may transmit an indication that a visual action event has occurred during live gameplay directly to the haptic peripheral device ecosystem coordination system 632.

Using these or other methods, the haptic peripheral device ecosystem coordination system 632 in an embodiment may identify occurrence of a visual action event indicator that is associated with a gaming action event within haptic data 694 stored at the language repository 690. For example, the haptic peripheral device ecosystem coordination system 632 in an embodiment may associate a single, large flash burst at the player avatar with the player avatar firing a single shot (as indicated in Table 1). As another example, the haptic peripheral device ecosystem coordination system 632 in an embodiment may associate a repeated, large flash burst at the player avatar with the player avatar continuously shooting. In still another example, the haptic peripheral device ecosystem coordination system 632 in an embodiment may associate a single, large flash burst near the player avatar and enemy avatar firing with an explosion nearby the player avatar. In yet another example, the haptic peripheral device ecosystem coordination system 632 in an embodiment may associate a single, medium flash burst to either side of the player avatar with an enemy bullet landing nearby the player avatar. In another example, the haptic peripheral device ecosystem coordination system 632 in an embodiment may associate water splash image with the player avatar moving into water. In still another example, the haptic peripheral device ecosystem coordination system 632 in an embodiment may associate single, flash burst at the enemy avatar and a large flash burst near the player avatar or a blood spatter image with the player avatar taking damage. In yet another example, the haptic peripheral device ecosystem coordination system 632 in an embodiment may associate a single, large flash burst at the player avatar and a flash burst at the enemy avatar with the enemy avatar taking damage.

In some embodiments, the identification of the occurrence of a gaming action event may be further informed by analysis of audio signals played via the thermo-haptic headset device 660, pursuant to commands received from the gaming software application 620, to identify audio action event indicators. Upon receipt of an audio signal by the headset controller 661 from the gaming software application 620 in an embodiment, the controller 661 may forward the audio signal or a version of the audio signal that has been processed (e.g., converted to the frequency spectrum) to the language repository 690 for storage within audio data 692. The haptic peripheral device ecosystem coordination system 632 may analyze such stored audio data 692 to identify when an audio action event indicator (e.g., gunfire, explosion, interaction of the player avatar with water) has occurred. The occurrence of such an audio action event indicator in an embodiment may be associated with one or more gaming action events. For example, the haptic peripheral device ecosystem coordination system 632 in an embodiment may analyze such stored audio data 692 to identify audio action event indicators, such as spikes in audio signal volume, duration of such spikes, or known patterns of such spikes (e.g., gun audio wave pattern, explosion audio wave pattern, water audio wave pattern). As described in greater detail with respect to TABLE 1, such audio action event indicators may be associated with one or more thermo-haptic feedbacks at one or more thermo-haptic input/output peripheral devices in an embodiment. Wave patterns may be identified in an embodiment by comparing amplitudes of audio signals to amplitudes of known, pre-labeled audio signals, such as gun, explosion, or water audio wave patterns. This comparison may be performed in various embodiments according to known audio analysis methods, and may include use of a neural network or an audio analysis software application operating at the information handling system, for example. In another embodiment, the gaming application 620 may transmit an indication that an audio action event has occurred during live gameplay directly to the haptic peripheral device ecosystem coordination system 632.

Using these or other methods, the haptic peripheral device ecosystem coordination system 632 in an embodiment may identify occurrence of an audio action event indicator that is associated with a gaming action event within haptic data 694 stored at the language repository 690. For example, the haptic peripheral device ecosystem coordination system 632 in an embodiment may associate a repeated, short, loud audio spike in a gun audio wave pattern with the player avatar continuously shooting (as indicated in Table 1). As another example, the haptic peripheral device ecosystem coordination system 632 in an embodiment may associate a repeated, short, loud audio spike in an explosion audio wave pattern with an explosion occurring nearby the player avatar. In still another example, the haptic peripheral device ecosystem coordination system 632 in an embodiment may associate a short, loud audio spike in water splash audio wave pattern with the player avatar moving into water. In yet another example, the haptic peripheral device ecosystem coordination system 632 in an embodiment may associate short, loud, audio spike in blood splatter audio wave pattern with the player avatar taking damage. In still another example, the haptic peripheral device ecosystem coordination system 632 in an embodiment may associate a short, soft audio spike in a gun audio wave pattern with the enemy avatar taking damage.

In still other embodiments, the identification of the occurrence of a gaming action event may be further informed by analysis of user input commands received via the thermo-haptic keyboard 640 or via the thermo-haptic mouse 650 via the peripheral device driver 114. This may occur in conjunction with identification of a gaming action event based on occurrence of a video action event indicator or an audio action event indicator in some embodiments. A single video action event indicator or audio action event indicator may be associated with a plurality of gaming action events, which may each be associated with a separate thermo-haptic feedback (as described by either or both a haptic movement command or haptic thermal command, and a haptic region identified within Table 1). For example, as shown in Table 1 above, a short, loud flash or audio spike in a gun audio wave pattern may be associated with both the gaming action event of the player avatar firing a single shot and the gaming action event of an enemy bullet landing nearby the player avatar. Further, the gaming action event of the player avatar firing a single shot may be associated with the thermo-haptic feedback (as described by a haptic movement command, a haptic thermal command, and a haptic region identified within Table 1) occurring at the mouse, while the gaming action event of the enemy bullet landing nearby the player avatar may be associated with the thermo-haptic feedback occurring at the keyboard palm rest.

In order for the haptic peripheral device ecosystem coordination system 632 in an embodiment to distinguish between these two gaming action events, and thus to identify the proper thermo-haptic input/output peripheral device (e.g., mouse 650 or keyboard 640) at which to execute the corresponding haptic movement command or haptic thermal command, the haptic peripheral device ecosystem coordination system 632 in an embodiment may analyze user input commands received from the keyboard 640 or mouse 650. The input from the thermo-haptic mouse 650 may be detected to determine the player avatar is firing a shot. For example, the haptic peripheral device ecosystem coordination system 632 in an embodiment may identify whether a user-input command was received from the mouse 650 or keyboard 640 just prior to flash or the analyzed audio signal that included the identified visual or audio action event indicator (e.g., a short, loud audio spike in a gun audio wave pattern). If such a user-input command was received immediately before playback of the analyzed audio signal, this may indicate that the identified visual or audio action event indicator is associated with a player-initiated gaming action event, such as the player avatar firing a weapon. If such a user-input command was not received immediately before the detected gaming action event, this may indicate that the identified visual or audio action event indicator is associated with a non-player-initiated gaming action event, such as an enemy avatar firing a weapon at the player avatar.

Upon determining that a gaming action event has occurred, the haptic peripheral device ecosystem coordination system 632 in an embodiment may identify a haptic movement command, a haptic thermal command, or both, that is associated with the identified gaming action event. The haptic peripheral device ecosystem coordination system 632 in an embodiment may make such a determination via reference to a data structure such as that reflected at Table 1, above, as stored within the haptic data 694 of the language repository 690. For example, the haptic peripheral device ecosystem coordination system 632 may identify a haptic movement command for executing a single, short pulse of movement at a thermo-haptic mouse 650 and at a low intensity, and a haptic thermal command for executing a short thermal increase of low intensity at the thermo-haptic mouse 650, based on a determination that the player avatar has fired a single shot. As another example, the haptic peripheral device ecosystem coordination system 632 may identify a haptic movement command for executing multiple short pulses of movement of low intensity at a thermo-haptic mouse 650, and a haptic thermal command for executing a long thermal increase of low intensity at the thermo-haptic mouse 650, based on a determination that the player avatar is continuously shooting.

Such haptic movement commands and haptic thermal commands may be executed at more than one of the thermo-haptic input/output peripheral devices (e.g., 640, 650, 660) in an embodiment. For example, the haptic peripheral device ecosystem coordination system 632 may identify a haptic movement command for executing three sets of short movement pulses of high intensity at a thermo-haptic headset 660, and a haptic thermal command for executing a short thermal decrease of high intensity at the thermo-haptic headset 660, based on a determination that enemy avatar has taken damage. As another example, the haptic peripheral device ecosystem coordination system 632 may identify a haptic movement command for executing a single, long pulse of movement of high intensity at a keyboard palm rest 642, and a haptic thermal command for executing a long thermal increase of high intensity at the keyboard palm rest 642, based on a determination that an explosion has occurred nearby the player avatar. In another example, the haptic peripheral device ecosystem coordination system 632 may identify a haptic movement command for executing single, short pulse of movement of high intensity at a keyboard palm rest 642, and a haptic thermal command for executing short thermal increase of high intensity at the keyboard palm rest 642, based on a determination that an enemy bullet has landed nearby the player avatar. In still another example, the haptic peripheral device ecosystem coordination system 632 may identify a haptic movement command for executing multiple, short movement pulses at low intensity at a keyboard palm rest 642, and a haptic thermal command for executing a long thermal decrease of high intensity at the keyboard palm rest 642, based on a determination that the player avatar has moved into water. In yet another example, the haptic peripheral device ecosystem coordination system 632 may identify a haptic movement command for executing single, long pulse of movement at high intensity at a keyboard palm rest 642, and a haptic thermal command for executing long thermal increase of high intensity at the keyboard palm rest 642, based on a determination that a player avatar has taken damage. Similar haptic feedback may be provided to haptic keys of keyboard 640, or a haptic mouse 650 in various embodiments.

In some embodiments, the haptic movement command or haptic thermal command may be associated with a haptic region within a thermo-haptic input/output peripheral device that incorporates a plurality of haptic regions. For example, the haptic movement command for a thermo-haptic keyboard 640 may identify a specific piezoelectric actuator or TEG array within one or more key switch structures (e.g., disposed between the key cap and the keyboard main printed circuit board) of a single key or a group of keys of the keyboard 640. As another example, the haptic movement command for a thermo-haptic keyboard palm rest 642 may identify a specific piezoelectric actuator, within a plurality of piezoelectric actuators disposed within the palm rest, as described in greater detail with respect to FIG. 2. As yet another example, the haptic thermal command for the thermo-haptic keyboard palm rest 642 may identify a specific TEG array, within a plurality of TEG arrays disposed within the palm rest, as also described in greater detail with respect to FIG. 2. In yet another example, the haptic movement command for a thermo-haptic mouse 650 may identify a specific piezoelectric actuator, within a plurality of piezoelectric actuators disposed within the mouse 650, as described in greater detail with respect to FIG. 3. As another example, the haptic thermal command for the thermo-haptic mouse 650 may identify a specific TEG array, within a plurality of TEG arrays disposed within the mouse 650, as also described in greater detail with respect to FIG. 3. In still another example, the haptic movement command for a thermo-haptic headset 660 may identify a specific piezoelectric actuator, within a plurality of piezoelectric actuators disposed within the headset 660, as described in greater detail with respect to FIG. 4. As another example, the haptic thermal command for the thermo-haptic headset 660 may identify a specific TEG array, within a plurality of TEG arrays disposed within the headset 660, as also described in greater detail with respect to FIG. 4.

The haptic movement command or haptic thermal command as stored within the haptic data 694 (e.g., as shown in Table 1) may be written in Extensible MarkUp Language (XML) that is executable by each of the headset controller 661, the keyboard controller 641, and the mouse controller 651. The XML description module 691 may operate to translate the XML haptic movement command or XML haptic thermal command into code instructions executable by one of the headset controller 661, the keyboard controller 641, or the mouse controller 651. In other embodiments, the haptic movement commands and haptic thermal commands identified in such a way (e.g., with reference to Table 1) may include pointers or hyperlinks to code instructions stored within the XML description module 691. In such a way, the haptic peripheral device ecosystem coordination system 632 may retrieve from the language repository 690 executable code instructions for initiating thermo-haptic feedback at one or more of the thermo-haptic input/output peripheral devices (e.g., 640, 650, or 660), based on identification of gaming action event occurring within live gameplay. The haptic peripheral device ecosystem coordination system 632 may then transmit the executable code instructions for initiating thermo-haptic feedback associated with the identified gaming action event to one or more of the thermo-haptic input/output peripheral devices (e.g., 640, 642, 650, or 660).

Figure 7:
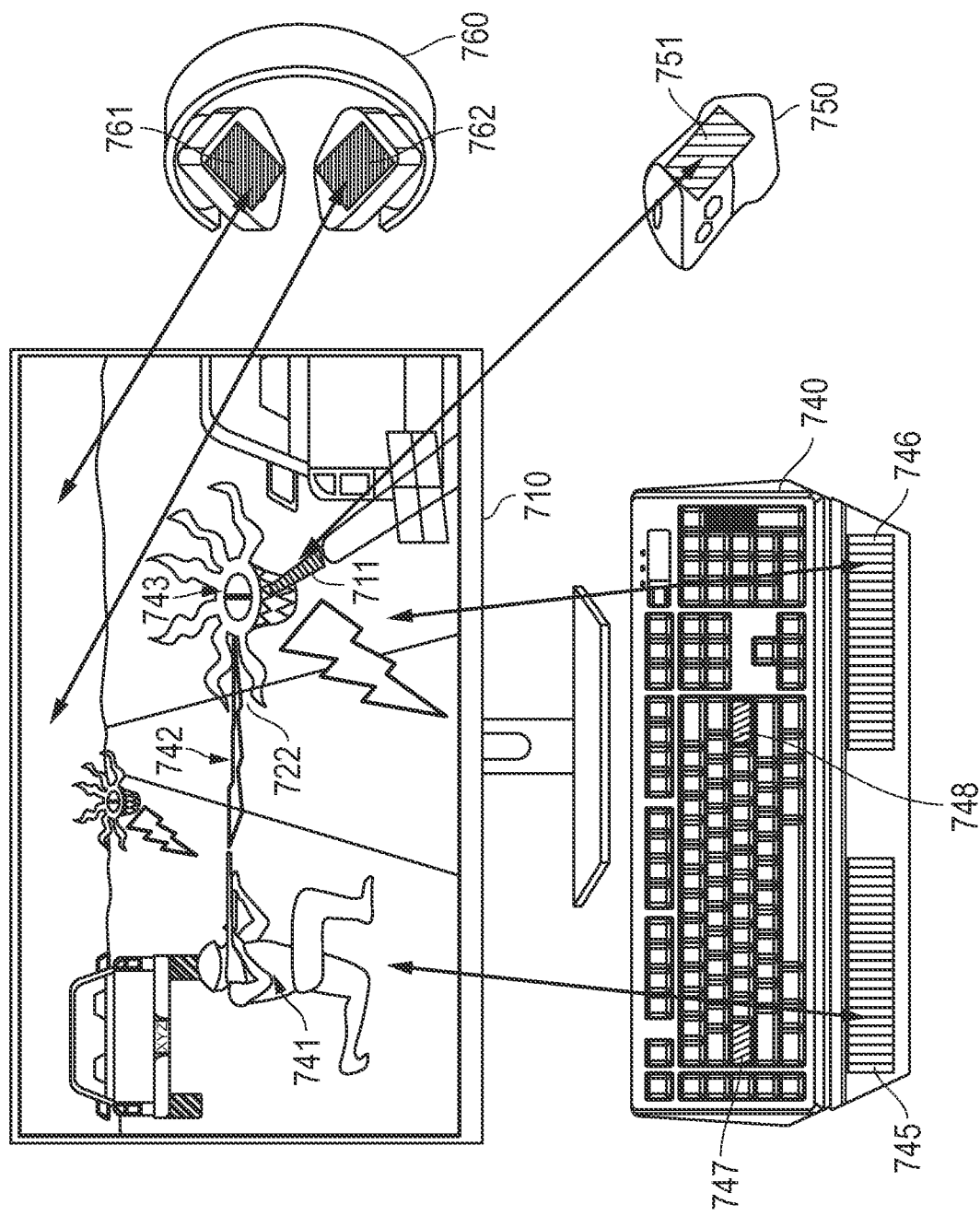
FIG. 7 is an image of a haptic peripheral device ecosystem according to an embodiment of the present disclosure.

FIG. 7 is an image of a haptic peripheral device ecosystem initiating coordinated haptic feedback at a plurality of peripheral devices based on live gameplay action events according to an embodiment of the present disclosure. As described herein, the haptic peripheral device ecosystem coordination system in an embodiment may coordinate thermo-haptic feedback across a plurality of thermo-haptic input/output peripheral devices, such as a thermo-haptic mouse 750, a thermo-haptic headset 760, or a thermo-haptic keyboard and palm rest assembly 740, based on identified gaming action events, and their types of locations, occurring within live gameplay of a gaming software application. The haptic peripheral device ecosystem coordination system in an embodiment may perform such coordination by determining a visual action event indicator or an audio action event indicator associated with a gaming action event has occurred, and identifying a haptic movement command, haptic thermal command, and haptic region associated with that gaming action event. In such an embodiment, the haptic peripheral device ecosystem coordination system may transmit executable code instructions to the thermo-haptic input/output peripheral device (e.g., 740, 750, or 760) associated with the identified haptic region for execution, causing thermo-haptic feedback indicative of the identified gaming action event at that peripheral device (e.g., 740, 750, or 760).

In an embodiment, the gaming software application generating the three-dimensional gaming environment displayed via the video display 710 may generate instructions or indicators identifying occurrence of a gaming action event within live gameplay, and its location or type. For example, the gaming application generating the three-dimensional gaming environment may be pre-programmed to transmit an indication that a specific gaming action event has occurred to the haptic peripheral device ecosystem coordination system. In such an embodiment, the haptic peripheral device ecosystem coordination system may then identify a haptic region within one or more of the peripheral devices (e.g., 740, 750, or 760) of the ecosystem of peripheral devices associated (e.g., within TABLE 1) with the gaming action event identified in the instruction or indicator received from the gaming application. The haptic peripheral device ecosystem coordination system in such an embodiment may then transmit a haptic command to render the haptic feedback so identified (e.g., with reference to TABLE 1) to the associated haptic region of the peripheral device (e.g., 740, 750, or 760). In still another embodiment, the gaming application may be pre-programmed to identify a haptic region within one or more of the peripheral devices (e.g., 740, 750, or 760) of the ecosystem of peripheral devices associated (e.g., within TABLE 1) with the gaming action event and to instruct the peripheral device driver to render that haptic feedback to the associated haptic region of the peripheral device (e.g., 740, 750, or 760).

The haptic peripheral device ecosystem coordination system in an embodiment may determine that a visual action event indicator associated with a gaming action event has occurred within live gameplay controller by the gaming software application. For example, the haptic peripheral device ecosystem coordination system in an embodiment may associate a single, large flash burst at the player avatar with the gaming action event 711 of a player avatar firing a single shot (as indicated in Table 1). In another example, the haptic peripheral device ecosystem coordination system 632 in an embodiment may associate a single, large flash burst at the player avatar and a flash burst at the enemy avatar with gaming action event 722 of the enemy avatar taking damage. In still another embodiment, the gaming application may transmit an indication that a visual action event has occurred during live gameplay directly to the haptic peripheral device ecosystem coordination system.

In some embodiments, the identification of the occurrence of a gaming action event may be further informed by analysis of audio signals played via the thermo-haptic headset device 760, pursuant to commands received from the gaming software application, to identify audio action event indicators. The occurrence of such an audio action event indicator in an embodiment may be associated with one or more gaming action events. For example, the haptic peripheral device ecosystem coordination system in an embodiment may associate a repeated, short, loud audio spike in a gun audio wave pattern with the player avatar continuously shooting (as indicated in Table 1). As another example, the haptic peripheral device ecosystem coordination system in an embodiment may associate a repeated, short, loud audio spike in an explosion audio wave pattern with an explosion occurring nearby the player avatar. In still another example, the haptic peripheral device ecosystem coordination system in an embodiment may associate a short, loud audio spike in water splash audio wave pattern with the player avatar moving into water. In yet another example, the haptic peripheral device ecosystem coordination system in an embodiment may associate short, loud, audio spike in blood splatter audio wave pattern with the player avatar taking damage. In another embodiment, the gaming application may transmit an indication that an audio action event has occurred during live gameplay directly to the haptic peripheral device ecosystem coordination system.

Upon determining that a gaming action event has occurred, the haptic peripheral device ecosystem coordination system in an embodiment may identify and transmit a haptic movement command, a haptic thermal command, or both, that is associated with the identified gaming action event to an identified thermo-haptic input/output peripheral device (e.g., 740, 750, or 760). For example, the haptic peripheral device ecosystem coordination system renders a detected gaming action event by type or location and may transmit to the thermo-haptic mouse 750 a haptic movement command for executing a single, short pulse of movement at haptic region 751 and at a low intensity, and a haptic thermal command for executing a short thermal increase of low intensity at the haptic region 751, based on a determination that the gaming action event is the player avatar has fired a single shot. As another example, the haptic peripheral device ecosystem coordination system may transmit to the thermo-haptic mouse 750 a haptic movement command for executing multiple short pulses of movement of low intensity at a haptic region 751, and a haptic thermal command for executing a long thermal increase of low intensity at the haptic region 751, based on a determination that the gaming action event is the player avatar is continuously shooting.

Such haptic movement commands and haptic thermal commands may be executed at more than one of the thermo-haptic input/output peripheral devices (e.g., 740, 750, 760) in an embodiment. The haptic peripheral device ecosystem coordination system coordinates the haptic feedback by determining which input/output devices are active and rendering the haptic feedback to haptic regions to create a three-dimensional haptic experience among the input/output devices. For example, the haptic peripheral device ecosystem coordination system may transmit to the thermo-haptic headset 760 a haptic movement command for executing three sets of short movement pulses of high intensity in one or more of haptic regions 761 or 762, and a haptic thermal command for executing a short thermal decrease of high intensity at the thermo-haptic headset 760, based on a determination that enemy avatar has taken damage. As another example, the haptic peripheral device ecosystem coordination system may transmit to the thermo-haptic keyboard and palm rest assembly 740 a haptic movement command for executing a single, long pulse of movement of high intensity at one or more of the haptic regions 745 or 746, and a haptic thermal command for executing a long thermal increase of high intensity at one or more of the haptic regions 745 or 746, or at one or more of the keys 747 or 748, based on a determination that an explosion has occurred nearby the player avatar.

The haptic feedback associated with an identified gaming action event in an embodiment may initiate haptic movement or thermo-haptic feedback of a portion of an input/output device (e.g., 740, 750, or 760) having a position with respect to the user that correlates to the position of the gaming action event (e.g., 711, 722, 742) with respect to the player's avatar within the virtual three-dimensional gaming environment. For example, the gaming action event 711, located in the bottom-right corner of the image of the virtual three-dimensional gaming environment and indicating an event occurring very near or at the player's avatar 710 may be associated with a haptic movement or thermo-haptic feedback within a haptic region toward the right of one or more input/output devices situated closest the user. In one such example embodiment, the gaming action event 711 may be associated with haptic movement or thermo-haptic feedback at the right side haptic region 746 of the haptic keyboard palm rest, or at the haptic region 751 of the haptic mouse 750. As another example, the gaming action event 742, located in the top-center of the image of the virtual three-dimensional gaming environment and indicating an event occurring relatively farther away from the player's avatar 710 may be associated with a haptic movement or thermo-haptic feedback of one or more function or number keys (e.g., 747 or 748) of a keyboard, or regions 761 or 762 of the haptic headset.

In some embodiments, the detected gaming action event may be associated with a plurality of haptic regions. For example, the ally attack gaming action event 742 in an embodiment may begin at the ally avatar 741, and move toward the enemy avatar 743. In such an example embodiment, the gaming action event 742 may be associated with a haptic movement or thermo-haptic feedback that begins in a haptic region located to the left of an input/output device, and proceeds across a plurality of haptic regions in a straight line to the right side of the input/output device. For example, the haptic movement or thermo-haptic feedback associated with gaming action event 742 may render at key 747, then proceed across the keyboard 740 to key 748. As another example, the haptic movement or thermo-haptic feedback associated with gaming action event 742 may render at the left-side haptic region 762 of the headset 760, then proceed over to the right-side haptic region 761 of the haptic headset 760. In such a way, the haptic peripheral device ecosystem coordination system may cause haptic feedback in one or more locations across a plurality of input/output devices (e.g., 740, 750, 760) that reflects the location of the gaming action event (e.g., 711 or 742) within the virtual three-dimensional gaming environment.

Figure 8:
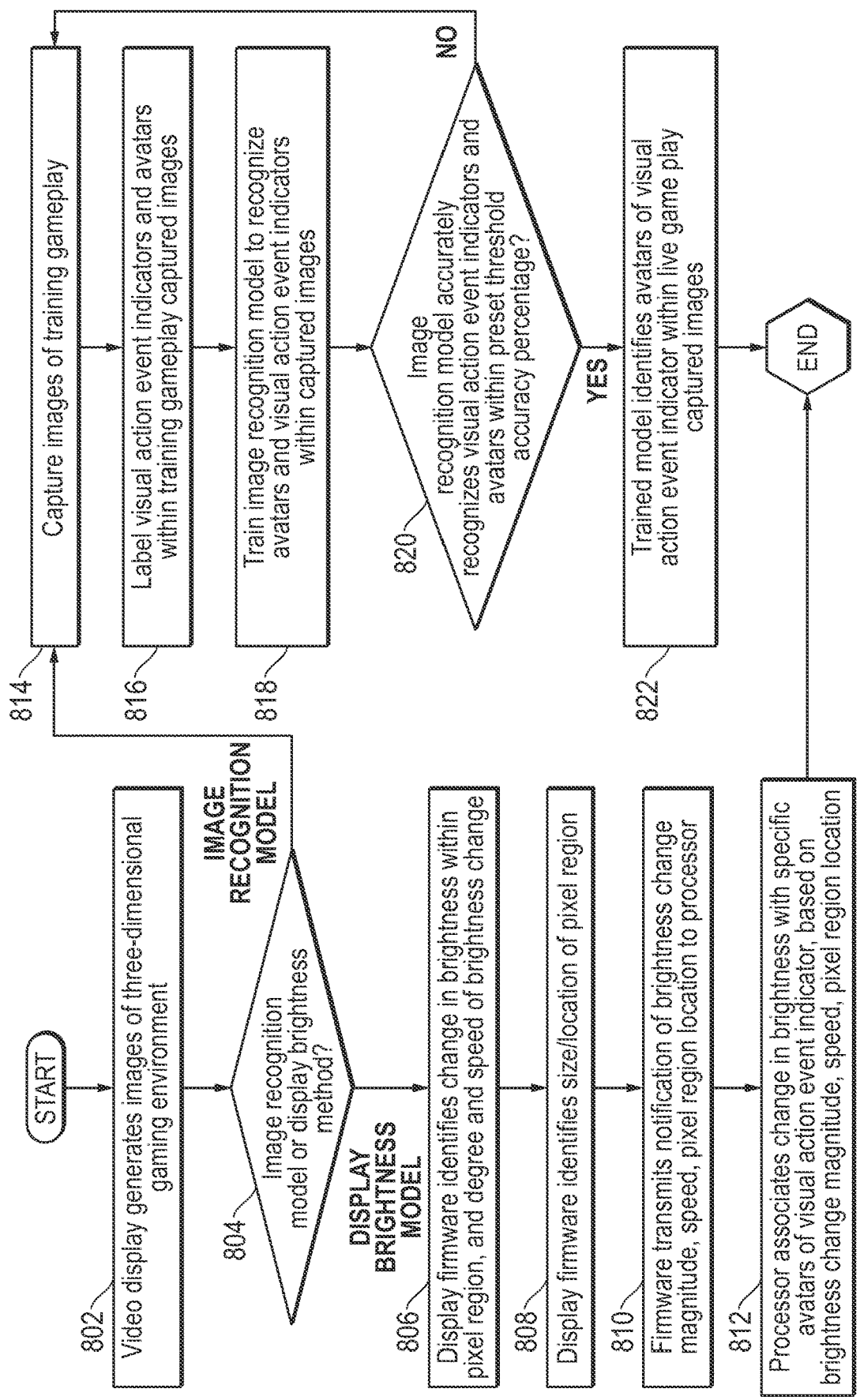
FIG. 8 is a flow diagram illustrating a method of identifying a visual gaming action event according to an embodiment of the present disclosure.

FIG. 8 is a flow diagram illustrating a method of identifying a visual action event via a trained image recognition model or via display firmware image analysis according to an embodiment of the present disclosure. As described herein, the haptic peripheral device ecosystem coordination system in an embodiment may identify live gameplay action events warranting thermo-haptic feedback at one of a plurality of thermo-haptic input/output peripheral devices using a plurality of different methods, including, for example, a trained image recognition model and a display brightness model.

At block 802, the display device may display an image of a three-dimensional gaming environment. For example, in an embodiment described with reference to FIG. 6, the gaming software application 620 may transmit display instructions to a video display 610, which may generate and display images of live gameplay, such as that described with reference to FIG. 5. As described with reference to FIG. 5, the three-dimensional gaming environment 500 displayed via the video display in an embodiment may display a player avatar 510 (often represented by a weapon held by the avatar) performing actions (e.g., firing a weapon or performing some other player attack action event 511) pursuant to user instructions input via the keyboard or mouse. One or more non-player avatars may also be displayed within the three-dimensional gaming environment 500, such as an enemy avatar (e.g., 520, or 530), or an ally avatar 540. The actions of the enemy avatar (e.g., 520 or 530) in an embodiment may be controlled by the gaming application in some embodiments. One or more of the avatars may be involved in some sort of gaming action event in an embodiment, such as firing a weapon or performing some other form of attack, and receiving damage from such an attack.

The haptic peripheral device ecosystem coordination system in an embodiment may determine at block 804 whether to identify visual action event indicators using a display brightness model or an image recognition model. This decision may be made based on user input, or based on availability of various models. For example, the display brightness model may decrease responsiveness or increase lag between user input and display of the avatar action performed in response. In such an embodiment, the user may choose to employ an image recognition model, if one is available. In another embodiment, an image recognition model may not be available, such as, if the model has yet to be trained. In such an embodiment, the haptic peripheral device ecosystem coordination system may default to use of the display brightness model. If the haptic peripheral device ecosystem coordination system uses the display brightness model to identify visual action event indicators, the method may proceed to block 806 for execution of such a display brightness model. If the haptic peripheral device ecosystem coordination system uses the image recognition model to identify visual action event indicators, the method may proceed to block 814 for execution of such an image recognition model.

At block 806, in an embodiment employing the display brightness model to identify visual action event indicators, the display firmware may identify a change in brightness within an identified pixel region, and a degree and speed of such a brightness change. The display firmware in an embodiment may operate, at least in part, to measure changes in pixel brightness over time, during live gameplay displayed via the video display. Changes in pixel brightness in an embodiment may indicate occurrence of a gaming action event in some circumstances. The size, position, and magnitude of such changes in pixel brightness may indicate the type of gaming action event and its location with respect to the player avatar in an embodiment, as described in greater detail below with respect to block 812.

The firmware for the display device may identify a size and location for the pixel region in which the change in brightness has been detected at block 808, in an embodiment. For example, the display monitor scalar firmware in an embodiment may be capable of accessing or generating the two-dimensional array of pixel values that associates each of the pixels in the display with a specific brightness value (e.g., between zero and 255 for 8-bit RGB color) at which it emits light to generate a single image of live gameplay. Each frame of live gameplay may be associated with a different two-dimensional pixel brightness array in an embodiment. The display monitor scalar firmware in an embodiment may compare a plurality of these two-dimensional pixel brightness arrays against one another in order to identify one or more pixels that underwent or are undergoing a change in pixel brightness value meeting a threshold value (e.g., a change of 100 or more). In such an embodiment, the display monitor scalar firmware may determine the size of a brightness change by determining the number of pixels so identified that are situated next to one another, for example.

Once one or more pixels are identified in such a way, the location of the pixels within the display may be determined by referencing the identification number of the pixel given within the two-dimensional array of pixel brightness values. Each pixel within a video display may be assigned a number based on its position within the display in an embodiment. For example, the top-left most pixel within a standard full high-definition 1080p computer video display that includes 2,073,600 pixels may be given an identifying number of 0000001, while the bottom-right most pixel may be given an identifying number of 2073600.

In some embodiments, the display monitor scalar firmware may associate this identifying number with a specific portion or zone of the displayed image. For example, the display monitor scalar firmware in an embodiment may divide the display view into four separate quadrants, with all pixels associated with only one of the four quadrants. In such an embodiment, the quadrant associated with the pixel may comprise the determined location of the pixel.

At block 810, the display device firmware may transmit a notification of brightness change magnitude, speed, and pixel region location to the processor in an embodiment. As described in an embodiment with respect to FIG. 1, the video display 110 that includes the display monitor scalar firmware may be operably connected to the haptic peripheral device ecosystem coordination system 132 via one or more buses 108. The display monitor scalar firmware in such an embodiment may use bus 108 to transmit the determined size and location of the pixels undergoing the identified change in brightness to the haptic peripheral device ecosystem coordination system 132. The display monitor scalar firmware may also transmit the magnitude of such change, as determined by comparing the values for a single pixel across multiple two-dimensional arrays (each representing a different frame of live game play) and the speed such change, as determined by dividing the magnitude by the number of frames so compared.

The haptic peripheral device ecosystem coordination system in an embodiment may associate the change in brightness with specific avatars or visual action event indicators, based on the brightness change magnitude, speed, or pixel region location at block 812. As described herein, changes in pixel brightness in an embodiment may indicate occurrence of a gaming action event in some circumstances. The size, position, and magnitude of such changes in pixel brightness may indicate the type of gaming action event and its location with respect to the player avatar in an embodiment. For example, in an embodiment described with reference to FIG. 5, the player attack gaming action event 511 may be displayed as a different color than the ally attack gaming action event 541, or than enemy avatar attack gaming action events 521 or 531. As another example, different weapons fired by the player avatar 510 in an embodiment may be associated with different colors, and thus, brightness values (e.g., a number between zero and 255 for 8-bit RGB color). In addition, certain weapons may be associated with longer duration firing bursts, resulting in slower changes in pixel brightness than a shot of a single bullet, for example, which may be rendered as a very quick flash of light.

The size of the change in pixel brightness, or the number of pixels undergoing such a change in brightness at any given instant in time may also be used to identify the gaming action event, or its location within the virtual three-dimensional gaming environment (e.g., 500). For example, gaming action events (e.g., enemy attack gaming action event 531) occurring farther away from the player avatar 510 than similar gaming action events (e.g., enemy attack gaming action event 521) may appear smaller in size by comparison. As another example, a damage caused by a grenade launcher may appear larger in size than damage caused by rifle fire.

The position of the pixels undergoing a change in brightness in an embodiment may further be used to identify the location of a gaming action event in an embodiment. For example, if the pixels undergoing brightness changes are within an upper portion of the video display in an embodiment, the change in brightness may be associated with a gaming action event occurring relatively farther away from the player avatar 510 than gaming action events depicted by changes in brightness in pixels within a lower portion of the video display. This may be the case, in an embodiment, because objects (e.g., enemy avatar 520) within the virtual three-dimensional gaming environment 500 that are located closer to the player avatar 510 are depicted more toward the bottom of the screen than are objects (e.g., enemy avatar 530) located farther from the player avatar 510. In some embodiments, the determination of the gaming action event and its location may be determined based on a combination of these factors. The method for identifying a visual action event indicator using the display brightness model may then end.

At block 814, in an embodiment in which the haptic peripheral device ecosystem coordination system identifies a visual action event indicator using an image recognition model, the haptic peripheral device ecosystem coordination system may capture images of training gameplay. The haptic peripheral device ecosystem coordination system in an embodiment may capture images of training gameplay including gaming action events and various avatars placed at varying depths with respect to the player avatar, and various viewing angles. For example, in an embodiment described with reference to FIG. 5, the haptic peripheral device ecosystem coordination system may capture images displayed within the virtual three-dimensional gaming environment 500. Captured images in an embodiment may comprise a flattened or two-dimensional image or view of three-dimensional game play. These captured images of training gameplay may include one or more avatars, such as for example, player avatar 510, ally avatar 540, enemy avatar 520, or enemy avatar 530. One or more gaming action events such as the player attack gaming action event 511, the enemy attack gaming action event 521, the enemy damage gaming action event 522, the enemy attack gaming action event 531, or the ally attack gaming action event 541 may also be included within the captured images of training gameplay. Further, the avatars and gaming action events may take place in different locations with respect to the player avatar 510 within the virtual three-dimensional gaming environment 500, and may thus be viewed from various angles. For example, the enemy avatar 520 and enemy avatar 530 may have different locations with respect to the player avatar 510 (e.g., enemy avatar 520 being located much closer to the player avatar 510 than enemy avatar 530), thus causing the player avatar 510 to view each of the enemy avatars (e.g., 520 and 530 from different angles).

In some circumstances, captured images of training gameplay may also include images of the avatars or actions events from various angles. For example, one captured image may include the player avatar 510 viewing the right-side of the ally avatar 540, as the ally avatar 540 fires from the left peripheral vision of the player avatar 510 toward the enemy avatar 520 within the right peripheral vision of the player avatar 510. As another example, a second captured image may include the player avatar 510 viewing the back of the ally avatar 540, as the ally avatar 540 fires from a position relatively closer to the player avatar 510 toward the enemy avatar 530 located relatively farther away from the player avatar 510.

The captured image in an embodiment may be described on a pixel by pixel basis, with each of the pixels in an image being associated with a value between 0 and 255, for example. In other embodiments, particularly with respect to high-definition images, the pixel values may adhere to a larger scale representative of a greater degree of granularity between pixel colors and brightness. A single captured image in an embodiment may thus be represented by a two-dimensional array, with one column identifying a pixel location within the captured image, and another column identifying the color value (e.g., between 0 and 255 for a typical 8-bit red/green/blue (RGB) image) of that pixel.

The haptic peripheral device ecosystem coordination system in an embodiment may label visual action event indicators and avatars within the training gameplay captured images at block 816. For example, the haptic peripheral device ecosystem coordination system in an embodiment may label the player avatar 510, ally avatar 540, enemy avatar 520, or enemy avatar 530 displayed within captured images of the virtual three-dimensional gaming environment 500. One or more gaming action events such as the player attack gaming action event 511, the enemy attack gaming action event 521, the enemy damage gaming action event 522, the enemy attack gaming action event 531, or the ally attack gaming action event 541 may also be labeled.

As described directly above, the labeled captured images may display each of the avatars and gaming action events from a plurality of angles. These labeled and captured images may form a set of images used to train an image recognition model, for rendering haptic feedback across a haptic keyboard and haptic palm rest, as described herein. The labels in an embodiment may be used to compare against attempts by an untrained image recognition model to identify avatars and gaming action events during training sessions for the image recognition model and association with haptic feedback types, location, duration, intensity, or movement pattern, as described in greater detail directly below. By training the image recognition model on labeled captured images that show each of the avatars and gaming action events from various angles may allow the image recognition model to later recognize these avatars and gaming action events regardless of the position or angle with respect to the player avatar at which they occur within the virtual three-dimensional gaming environment.

At block 818, the haptic peripheral device ecosystem coordination system in an embodiment may train an image recognition model to recognize avatars and visual action events within the captured training gameplay images. The image recognition model in an embodiment may comprise a feed-forward convolution neural network (CNN) having multiple layers, including an input layer, one or more hidden layers, and an output layer. In some embodiments, a single image recognition model (e.g., single CNN) may be trained to identify a plurality of features (e.g., objects, avatars, gaming action events) within a single captured image. In other embodiments, separate image recognition models may be developed, with each image recognition model operating as a classifier to detect whether an image includes only one identified feature (e.g., a class of gaming action events of class of associated location or types of haptic tactile feedback to be rendered on a haptic keyboard or haptic palm rest region). For example, one image recognition model may operate to identify images in which a player attack gaming action event (e.g., 511) is displayed, while another image recognition model operates to identify images in which an ally attack gaming action event (e.g., 541) is displayed.

Various pre-processing steps may be applied to the image captured at block 814 in order to convert it into an input understood by a feed-forward neural network. For example, a convolutional method may be applied to the captured image, as well as linear rectification or pooling methods in some embodiments. Such pre-processing may begin with a two-dimensional array of values describing the pixel values representing one or more images captured at block 814. Each of these pixels may be grouped into a matrix of a preset size (e.g., 3×3 pixels). A convolution step in an embodiment may involve mathematical convolution of two of such matrices that overlap one another (e.g., share a row or column of pixels with one another).

Conventional convolutions methods known in the art may be used to perform this step. For example, the Python programming language provides functionality for applying a user-defined convolution operation to pixel values within a two-dimensional array. Such a convolution method may produce a feature map of the two-dimensional image of the virtual three-dimensional gaming environment (e.g., 500) captured at block 814 and labeled at block 704. The convolution applied may be defined by the user by selecting one or more types of filters that operate to weight the pixel values (e.g., between 0 and 255) in various ways prior to matrix multiplication. The type of filters chosen and applied by the user in such a way may alter the pixel values of the captured image in order to make image detection easier. For example, filters may sharpen or focus the image, blur the image, or enhance edges of objects, avatars, or gaming action events displayed within a captured image.

Convolutional methods in an embodiment may be followed by a pooling step, or in some embodiments, by a rectified linear unit activation function (ReLU) step between the convolutional and pooling. The ReLU step may apply a rectified linear unit activation function to the product of the convolution step in an embodiment in order to overcome the vanishing gradient problem endemic to many image recognition models, allowing models to learn faster and perform better. Various models are contemplated.

A pooling step in an embodiment may operate to reduce the size of the feature map, increase computational speed, and avoid overfitting. Pooling in an embodiment involves separating the captured image forming the basis of the input layer into non-overlapping and uniform blocks of pixels, and discarding all but the maximum value across all of the pixels within that block (e.g., node value for the brightest pixel within that block). This greatly reduces the size of the feature map, and increases the computational speed of the image recognition model. Various pooling functions exist in the art, including maximum pooling (e.g., as described directly above), average pooling (taking the average of all pixel values within a pixel block), and sum pooling (adding together each of the pixel values for the pixels within the block). Regardless of the pooling function applied, the pooling layer may reduce the size of information used by the image recognition model to analyze the captured image. The pooling step may be skipped in some embodiments, especially as computational resources increase, or as convolutional methods evolve to produce smaller feature maps.

The feature map resulting from such a convolution (and optionally by additional linear rectification or pooling) may be flattened into a single vector forming the first of a plurality of fully-connected layers of a feed-forward neural network. Each of the values within this single vector may constitute a value of a node within the input layer of the neural network. As described above, the neural network in an embodiment may operate to identify whether an image includes one or more specific features (e.g., avatar, gaming action event, object). A neural network operating to determine whether a single identified feature (e.g., enemy avatar, player initiated attack gaming action event, enemy avatar taking damage gaming action event) is displayed within an image in an embodiment may include a first hidden layer following the input layer, where each of the nodes of the first hidden layer provides a best guess (0 for no, and 1 for yes, for example) as to whether the image includes the specifically identified feature. The neural network of the image recognition model may be modeled using any number of layers, and the nodes in each additional layer may be determined based on the value of the nodes in the previous layer and the weight matrices describing correlations between each of the values within the flattened feature map and identified features. In other words, each new layer in the neural network may include a plurality of nodes, with each representing a best guess of whether a value within the flattened feature map is associated with a the specifically identified feature within the image of the virtual three-dimensional gaming environment captured at block 814.

A greater number of layers within the neural network topology may decrease the likelihood of divergence (yielding unusable results), but may increase processing time. The neural network of the image recognition model may then produce an output layer including a plurality of nodes, each representing a best guess (either 0 or 1) indicating the presence of the specifically identified feature (e.g., enemy avatar or specific gaming action event) within the image captured at block 814, labeled at block 816, and input into the untrained model at block 818 during a training session. Each of the node values within the output layer in an embodiment (e.g., each represented by a binary 0 or 1) may be averaged to produce a percentage likelihood (e.g., value between 0 and 1) that the input training image depicts the specific feature the model is being trained to identify or classify. The process of generating an output layer, based on a known set of input layer values may be described herein as forward propagation.

The haptic peripheral device ecosystem coordination system in an embodiment may compare the percentage likelihood (e.g., value between 0 and 1), taken as an average across the node values of the output layer, to a known value indicating whether the image input into the model at block 818 does (e.g., represented by the value 1) or does not (e.g., represented by the value 0) include the specific feature the model is training to recognize, based on the labeling of the image at block 816. The difference between the percentage likelihood and the known value in such an embodiment may be referred to herein as the error signal for this initial forward propagation. For example, an initial forward propagation of the image recognition model during a training session in an embodiment may produce an output layer averaging 0.76 likelihood that the image captured at block 814 includes a player attack gaming action event 511. The image captured at block 814 in such an embodiment may have been associated with a value of one at block 816, indicating the captured image does include the player attack gaming action event 511. In such an embodiment, the error function for the initial forward propagation may be 0.24. Each forward propagation occurring during such a training session may produce a separate error signal in an embodiment as the training session progresses, as described in greater detail below.

The haptic peripheral device ecosystem coordination system may then use this known error function to adjust weight matrices associated with each layer of the modeled neural network that describe the interrelationship between each of the nodes within the input layer, hidden layers, and output layer. For example, the haptic peripheral device ecosystem coordination system may perform a back-propagation method to adjust each of the weight matrices in order to more accurately reflect the correlations between each of the values within the feature map represented within the input layer and a likelihood that such a value indicates the presence of the feature (e.g., player attack gaming action event 511) the model is training to recognize. The haptic peripheral device ecosystem coordination system may then forward propagate the same input node values used in the first forward propagation through each of the weight-adjusted hidden layers to produce a new output layer and a new error signal. The haptic peripheral device ecosystem coordination system may repeatedly perform this forward propagation and back propagation until the output layer produces a likelihood that the image contains the feature the model is training to recognize that matches the known value (e.g., as applied during labeling of the image at block 816). For example, if the image is known to contain the feature (e.g., player attack gaming action event 511) the model is training to detect, the image may be associated with a value of one, and the haptic peripheral device ecosystem coordination system may perform the forward and back propagation method until the model outputs nodes having an average value sufficiently close to the value of one that the model may be considered as accurately recognizing the feature or absence thereof within the image. The average output node value may be sufficiently close to the known value of one if it meets a preset threshold value (e.g., 99%, 99.9%, etc.) in an embodiment. In other words, the model may be said to accurately recognize the feature (e.g., player attack gaming action event 511) or absence thereof within a single training image if it can recognize the feature or lack thereof within the single image with an accuracy of 99%, for example.

The haptic peripheral device ecosystem coordination system in an embodiment may determine at block 820 whether the image recognition model accurately recognizes visual action events and avatars within a preset threshold accuracy percentage. The haptic peripheral device ecosystem coordination system in an embodiment may repeatedly perform the forward propagation and backward propagation described with respect to block 818, using different input node values, to finely tune the weight matrices of the image recognition model. In other words, the image recognition model may be trained on a plurality of different captured images, each depicting (or not depicting) the specifically identified feature (e.g., player attack gaming action event 511) at various locations within the image, or as seen from various angles.

The image recognition model in an embodiment may be considered fully trained at block 818 to identify a given feature (e.g., player attack gaming action event 511) when the image recognition model accurately identifies the feature or lack thereof, as described directly above with respect to block 818 within a preset threshold percentage of the captured images forming the training set. For example, the preset threshold accuracy percentage in an embodiment may set to 70% in an embodiment in which the training set contains 100 captured and labeled images. In such an embodiment, the haptic peripheral device ecosystem coordination system may determine at block 820 whether the image recognition model can accurately identify the feature for which it is trained, or lack thereof, in 70 of the 100 captured and labeled images comprising the training set. This is only an example threshold accuracy percentage value and is meant to be illustrative rather than limiting. Other embodiments may require higher (e.g., 90%, 95%, etc.) or lower (e.g., 65%, 60%, etc.) preset threshold accuracy percentage values. If the image recognition model can accurately recognize gaming action events and avatars within tolerances at block 820, the method may proceed to block 822 for application of the trained image recognition model to live gameplay images for identification of live gaming action events. If the image recognition model cannot accurately recognize gaming action events and avatars within tolerances at block 820, the method may proceed back to block 814 to further train the image recognition model on additional training gameplay images with modified weighting, etc.

At block 822, the haptic peripheral device ecosystem coordination system in an embodiment may use the trained image recognition model to identify avatars or visual action event indicators within live game play captured images. A live gameplay image in an embodiment may depict a plurality of avatars or a plurality of gaming action events, each located at various positions with respect to the player avatar. The live gameplay image in an embodiment may be described by a two-dimensional array of pixel values, similar to the captured images within the training set. Additionally, the live gameplay image may undergo the pre-processing convolutional, ReLU, pooling, or flattening steps described above with respect to the captured images within the training set to produce a flattened feature map for the live gameplay image. This step may occur repeatedly and in real-time in order to detect the occurrence of specific features (e.g., gaming action events), as they occur during gameplay.

The haptic peripheral device ecosystem coordination system in an embodiment may input the captured image of live gameplay into the trained image recognition model or trained inference model. The flattened feature map of the live gameplay image may be input into the image recognition model in such an embodiment. The image recognition model may then output a percentage likelihood that the live gameplay image includes the feature (e.g., player attack gaming action event 511) the image recognition model has been trained to detect or recognize. If the percentage likelihood that the live gameplay image includes the feature meets a preset threshold detection value (e.g., 90%, 95%, etc.), the 3D haptic keyboard and palm rest system may determine that a specific gaming action event (e.g., player attack gaming action event) has occurred.

In some embodiments, portions of a single captured image of live gameplay may be input into the trained model, serially, in order to determine whether the feature the model is trained to detect is being displayed within a specific portion of the whole image. The haptic peripheral device ecosystem coordination system in an embodiment may perform such a segmentation in order to identify which portion of the virtual 3D gaming environment 500 in which a particular gaming action event occurs during live gameplay. For example, the captured image may depict the player avatar's view of the entire virtual 3D gaming environment 500 in an embodiment. In some embodiments, such a captured image may be segmented into a plurality of smaller images, each representing a zone or quadrant within the full captured image. More specifically, the full captured image may be segmented into four separate images, including an upper right portion, an upper left portion, a lower left portion, and a lower right portion. This is only one example of such a segmentation, and it is contemplated segmentation into a greater number of zones or portions may be employed. Increasing the number of segmentation zones in an embodiment may increase the granularity of gaming action event location determination, but may also increase computational resources required to perform such a determination.

Following such a segmentation in such an embodiment, the segmented images (e.g., four separate segmented images in the example described directly above) may each be pre-processed, and their flattened feature maps may be input into the image recognition model to determine whether a specific gaming action event has occurred within a specific segmented zone or portion of the full image. The image recognition model(s) in such an embodiment may then provide an output indicating whether a specific gaming action event (e.g., player attack 511) has occurred within a specific segmented zone or portion of the player avatar's view of the virtual 3D gaming environment (e.g., 500). This may provide a rough orientation of the gaming action event with respect to the player avatar (e.g., to the left for the left two quadrants, or farther away for the top two quadrants). In such a way, the haptic peripheral device ecosystem coordination system in an embodiment may gauge the location of an identified gaming action event within a captured image of live gameplay.

The image of live gameplay may be input into a plurality of image recognition models in some embodiments, with each model trained to detect a different feature. In such an embodiment, each of the plurality of image recognition models may be trained to one of a plurality of gaming action events the haptic peripheral device ecosystem coordination system associates with a specific type of haptic feedback. For example, a first image recognition model may be trained to identify a player attack gaming action event (e.g., 511), a second image recognition model may be trained to identify an enemy attack gaming action event (e.g., 521 or 531), a third image recognition model may be trained to identify an enemy damage gaming action event (e.g., 522), and a fourth image recognition model may be trained to identify an ally attack gaming action event (e.g., 541). In other embodiments, a single image recognition model may be trained to identify each of these gaming action events or features. Regardless of the specific embodiment employed herein, the haptic peripheral device ecosystem coordination system in an embodiment may operate to identify the occurrence or lack thereof of a plurality of visual action event indicators associated with haptic feedback within a single captured image of live gameplay. Block 822 may be repeated continuously throughout such live gameplay in an embodiment in order for the haptic peripheral device ecosystem coordination system to detect gaming action events associated with haptic feedback in real-time, as they occur during live gameplay. The method for identifying a visual action event indicator using a trained image recognition model may then end.

Figure 9:
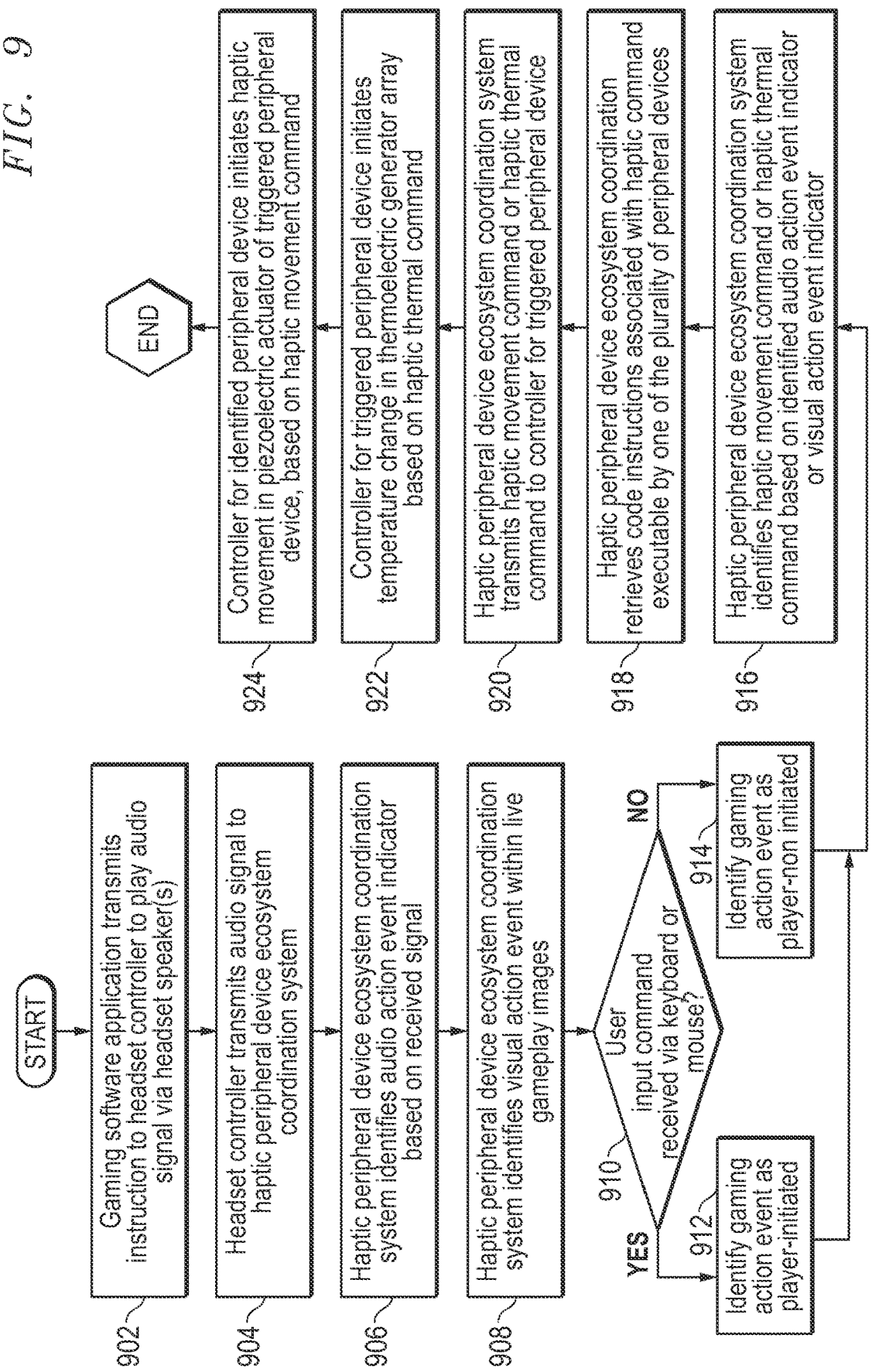
FIG. 9 is a flow diagram illustrating a method of initiating thermo-haptic feedback at a plurality of peripheral devices according to an embodiment of the present disclosure.

FIG. 9 is a flow diagram illustrating a method of initiating haptic movement or thermal feedback at a peripheral device within a haptic peripheral ecosystem based on identified visual or audio action events occurring during live gameplay according to an embodiment of the present disclosure. As described herein, the haptic peripheral device ecosystem coordination system in an embodiment may coordinate rendering thermo-haptic feedback across a plurality of thermo-haptic input/output peripheral devices, such as a thermo-haptic mouse, a thermo-haptic headset, a thermo-haptic keyboard, or a thermo-haptic palm rest assembly, based on identified gaming action events occurring within live gameplay of a gaming software application. In one embodiment, the gaming application may transmit an indication that a gaming action event has occurred to the haptic peripheral device ecosystem coordination system. In another embodiment, the haptic peripheral device ecosystem coordination system may perform such coordination by determining a visual action event indicator or an audio action event indicator associated with a gaming action event has occurred, and transmitting a haptic movement command or haptic thermal command associated with that gaming action event to a thermo-haptic input/output peripheral device also associated with that gaming action event. Execution of such commands at the thermo-haptic input/output peripheral device may thus cause thermo-haptic feedback indicative of the identified gaming action event at that peripheral device.

At block 902, a gaming software application may transmit an instruction to a headset controller to play an audio signal via headset speakers of an audio headset peripheral device. For example, in an embodiment described with reference to FIG. 6, the gaming software application 620 may transmit audio commands or audio signals to the controller 661 of a thermo-haptic headset device 660, which may play the audio signal via one of more speakers incorporated therewithin.

A controller for the audio headset peripheral device may transmit an indication that the audio signal has been played via either the left or right speaker, and a description of the audio signal to the haptic peripheral device ecosystem coordination system in an embodiment at block 904. For example, the thermo-haptic headset device 660 may also transmit these audio signals to the language repository 690 for storage within audio data 691, which may be accessed by the haptic peripheral device ecosystem coordination system 632.

At block 906, the haptic peripheral device ecosystem coordination system may identify an audio action event indicator based on the received description of the audio signal. For example, the haptic peripheral device ecosystem coordination system 632 may analyze stored audio data 692 to identify when an audio action event indicator (e.g., gunfire, explosion, interaction of the player avatar with water) has occurred. The occurrence of such an audio action event indicator in an embodiment may be associated with one or more gaming action events. For example, the haptic peripheral device ecosystem coordination system 632 in an embodiment may analyze such stored audio data 692 to identify audio action event indicators, such as spikes in audio signal volume, duration of such spikes, or known patterns of such spikes (e.g., gun audio wave pattern, explosion audio wave pattern, water audio wave pattern). As described in greater detail with respect to TABLE 1, such audio action event indicators may be associated with one or more thermo-haptic feedbacks at one or more thermo-haptic input/output peripheral devices in an embodiment.

Using these or other methods, the haptic peripheral device ecosystem coordination system 632 in an embodiment may identify occurrence of an audio action event indicator that is associated with a gaming action event within haptic data 694 stored at the language repository 690. For example, the haptic peripheral device ecosystem coordination system 632 in an embodiment may associate a repeated, short, loud audio spike in a gun audio wave pattern with the player avatar continuously shooting (as indicated in Table 1).

At block 908, the haptic peripheral device ecosystem coordination system in an embodiment may identify a visual action event within live gameplay images. For example, such visual action events may be identified using one or more of the methods described with reference to FIG. 8. In some embodiments, this block may be skipped, and the method may proceed directly to block 910, for determination whether a user input has been received. In other words, the gaming action event may be identified using identification of an audio action event identifier, without analysis of a visual action event indicator in some embodiments. In still other embodiments, the gaming action event may be identified using identification of a visual action event identifier, without analysis of an audio action event indicator. In such an embodiment, the method may proceed directly from block 902 to block 908.

The haptic peripheral device ecosystem coordination system in an embodiment may determine at block 910 whether a user input command was received via the keyboard or mouse just prior to detection of the audio action event indicator. For example, as described with reference to an embodiment in FIG. 6, a single audio action event indicator or a single visual action event indicator may be associated with a plurality of gaming action events, which may each be associated with a separate thermo-haptic feedback (as described by either or both a haptic movement command or haptic thermal command, and a haptic region identified within Table 1). For example, the haptic peripheral device ecosystem coordination system 632 in an embodiment may identify whether a user-input command was received from the mouse 650 or keyboard 640 just prior to the detected visual action event indicator or the identified audio action event indicator (e.g., a short, loud audio spike in a gun audio wave pattern).

In order for the haptic peripheral device ecosystem coordination system 632 in an embodiment to distinguish between two gaming action events associated with the same audio action event indicator (e.g., a short, loud audio spike in a gun audio wave pattern), or the same visual action event indicator, and thus to identify the proper thermo-haptic input/output peripheral device (e.g., mouse 650 or keyboard 640) at which to execute the corresponding haptic movement command or haptic thermal command, the haptic peripheral device ecosystem coordination system 632 in an embodiment may analyze user input commands received from the keyboard 640 or mouse 650. If such a user-input command was received immediately before the detected visual action event indicator or audio action event indicator, this may indicate that the identified audio action event indicator or visual action event indicator is associated with a player-initiated gaming action event, such as the player avatar firing a weapon. Thus, if a user input command was received just prior to detection of the visual or audio action event indicator, the method may proceed to block 912 to identify the gaming action event as player-initiated. If such a user-input command was not received immediately before detection of the visual or audio action event indicator, this may indicate that the identified audio action event indicator is associated with a non-player-initiated gaming action event, such as an enemy avatar firing a weapon at the player avatar. Thus, if no user input command was received just prior to detection of the audio or visual action event indicator, the method may proceed to block 914 to identify the gaming action event as non-player-initiated. In an embodiment in which the audio action event indicator identified at block 906, or a visual action event indicator identified at block 908 is associated with only one gaming action event, the method may skip blocks 910, 912, and 914, and may proceed directly to block 916.

At block 912, in an embodiment in which user input command was received just prior to occurrence of the audio or visual action event indicator, the haptic peripheral device ecosystem coordination system may associate the audio or visual action event indicator with a player-initiated gaming action event. For example, the haptic peripheral device ecosystem coordination system may associate a short, loud audio spike in a gun audio wave pattern that occurs immediately following receipt of a user input command with the player-initiated gaming action event of the player avatar firing a single shot, rather than the non-player-initiated gaming action event of an enemy bullet landing nearby the player avatar. The method may then proceed to block 916 for identification of a haptic movement command or haptic thermal command.

In an embodiment in which user input command was not received just prior to occurrence of the audio or visual action event indicator, the haptic peripheral device ecosystem coordination system at block 914 may associate the audio or visual action event indicator with a non-player-initiated gaming action event. For example, the haptic peripheral device ecosystem coordination system may associate a short, loud audio spike in a gun audio wave pattern that occurs without an accompanying user input command with the non-player-initiated gaming action event of an enemy bullet landing nearby the player avatar, rather than the player-initiated gaming action event of the player avatar firing a single shot. The method may then proceed to block 916 for identification of a haptic movement command or haptic thermal command.

The haptic peripheral device ecosystem coordination system in an embodiment may identify a haptic movement command or haptic thermal command based on the identified audio event type or visual action event at block 916. For example, in an embodiment described with reference to FIG. 6, upon determining that a gaming action event has occurred, the haptic peripheral device ecosystem coordination system 632 in an embodiment may identify a haptic movement command, a haptic thermal command, or both, that is associated with the identified gaming action event. The haptic peripheral device ecosystem coordination system 632 in an embodiment may make such a determination via reference to a data structure such as that reflected at Table 1, above, as stored within the haptic data 694 of the language repository 690. For example, the haptic peripheral device ecosystem coordination system 632 may identify a haptic movement command for executing a single, short pulse of movement at a thermo-haptic mouse 650 and at a low intensity, and a haptic thermal command for executing a short thermal increase of low intensity at the thermo-haptic mouse 650, based on a determination that the player avatar has fired a single shot.

At block 918, the haptic peripheral device ecosystem coordination system in an embodiment may retrieve code instructions associated with the haptic movement command or the haptic thermal command that is executable by one of the plurality of peripheral devices from a language repository. For example, in an embodiment described with reference to FIG. 6, the haptic movement commands and haptic thermal commands identified at block 916 may include pointers or hyperlinks to code instructions stored within the XML description module 691. Such code instructions in an embodiment may be written in a format (e.g., Extensible MarkUp Language (XML)) that is executable by each of the headset controller 661, the keyboard controller 641, and the mouse controller 651. In other embodiments, the haptic movement command or haptic thermal command as stored within the haptic data 694 (e.g., as shown in Table 1) may be written in XML, and the XML description module 691 may operate to translate the XML haptic movement command or XML haptic thermal command into code instructions executable by one of the headset controller 661, the keyboard controller 641, or the mouse controller 651. In such a way, the haptic peripheral device ecosystem coordination system 632 may retrieve from the language repository 690 executable code instructions for initiating thermo-haptic feedback at one or more of the thermo-haptic input/output peripheral devices (e.g., 640, 650, or 660), based on identification of gaming action event occurring within live gameplay.

The haptic peripheral device ecosystem coordination system in an embodiment may transmit the haptic movement command or haptic thermal command executable code instructions to the controller for the triggered peripheral device at block 920. The haptic peripheral device ecosystem coordination system 632 may transmit the executable code instructions for initiating thermo-haptic feedback associated with the identified gaming action event to one or more of the thermo-haptic input/output peripheral devices (e.g., 640, 650, or 660). For example, the haptic peripheral device ecosystem coordination system in an embodiment may transmit code instructions executable by the thermo-haptic mouse 650 to generate a single, short pulse of movement at low intensity at a piezoelectric actuator within the thermo-haptic mouse 650 and to generate a short, thermal increase of low intensity at a TEG array within the thermo-haptic mouse 650. The haptic peripheral device ecosystem coordination system in such an embodiment may transmit such executable code instructions to the thermo-haptic mouse 650 in response to a determination that the gaming action event of the player avatar firing a single shot has occurred, based on analysis of one or both of a visual action event indicator or an audio action event indicator.

As another example, the haptic peripheral device ecosystem coordination system in an embodiment may transmit code instructions executable by the thermo-haptic keyboard and palm rest assembly 642 to generate a single, long pulse of movement at high intensity at a piezoelectric actuator within the thermo-haptic keyboard and palm rest assembly 642 and to generate a long thermal increase of high intensity at a TEG array within the thermo-haptic keyboard and palm rest assembly 642. The haptic peripheral device ecosystem coordination system in such an embodiment may transmit such executable code instructions to the thermo-haptic keyboard and palm rest assembly 642 in response to a determination that the gaming action event of an explosion nearby the player avatar has occurred.

In yet another example, the haptic peripheral device ecosystem coordination system in an embodiment may transmit code instructions executable by the thermo-haptic headset 660 to generate three sets of short movement pulses at high intensity at a piezoelectric actuator within the thermo-haptic headset 660 and to generate a short thermal decrease of high intensity at a TEG array within the thermo-haptic headset 660. The haptic peripheral device ecosystem coordination system in such an embodiment may transmit such executable code instructions to the thermo-haptic headset 660 in response to a determination that the gaming action event of the enemy avatar taking damage has occurred.

At block 922, a controller for the triggered peripheral device may initiate a temperature change in a TEG array based on the received haptic thermal command. For example, in an embodiment described with reference to FIG. 1, the controller 141 of the thermo-haptic input/output peripheral device 112 (which may comprise, in various embodiments, a thermo-haptic mouse, a thermo-haptic keyboard and palm rest assembly, or a thermo-haptic headset) may receive a haptic movement command or haptic thermal command from the haptic peripheral device ecosystem coordination system 132 via bus 108 and peripheral device driver 114. In various embodiments, the controller 141 may comprise a mouse controller, a keyboard controller, or a headset controller as described in greater detail with respect to FIGS. 2, 3, and 4.

In an embodiment described with reference to FIG. 2, for example, the keyboard controller may execute code instructions to generate a single, long pulse of movement at high intensity at a piezoelectric actuator (e.g., 234 or 236) within the thermo-haptic keyboard and palm rest assembly 200 and to generate a long thermal increase of high intensity at a TEG array (e.g., 270-1 or 270-2) within the thermo-haptic keyboard and palm rest assembly 200. The keyboard controller may perform such an execution by causing the keyboard main printed circuit board 240 to transmit a first electrical charge of a preset duration, magnitude, or polarity to the piezoelectric actuator (e.g., 234 or 236) identified by the keyboard controller based on the received haptic movement command. The keyboard controller may also cause the keyboard main printed circuit board 240 to transmit a second electrical charge of a preset duration, magnitude, or polarity to the TEG array (e.g., 270-1 or 270-2) identified by the keyboard controller based on the received haptic thermal command.

As another example, in an embodiment described with reference to FIG. 3, a mouse controller may execute code instructions to generate a single, short pulse of movement at low intensity at a piezoelectric actuator (e.g., 330-1 or 330-2) and to generate a short, thermal increase of low intensity at a TEG array (e.g., 370-1, or 370-2) within the thermo-haptic mouse 350. The mouse controller may perform such an execution by causing the mouse printed circuit board 340 to transmit a first electrical charge of a preset duration, magnitude, or polarity to the piezoelectric actuator (e.g., 330-1 or 330-2) identified by the mouse controller based on the received haptic movement command. The mouse controller may also cause the mouse printed circuit board 340 to transmit a second electrical charge of a preset duration, magnitude, or polarity to the TEG array (e.g., 370-1 or 370-2) identified by the mouse controller based on the received haptic thermal command.

In still another example, in an embodiment described with reference to FIG. 4, a headset controller may execute code instructions to generate three sets of short movement pulses at high intensity at a piezoelectric actuator situated beneath one of the headset haptic movement regions (e.g., 463 or 464) and to generate a short thermal decrease of high intensity at a TEG array situated within the thermo-haptic headset 460, beneath one of the headset haptic thermal regions (e.g., 461, or 462). The headset controller may perform such an execution by causing a headset printed circuit board to transmit a first electrical charge of a preset duration, magnitude, or polarity to the piezoelectric actuator situated beneath one of the headset haptic movement regions (e.g., 463 or 464) and identified by the headset controller based on the received haptic movement command. The headset controller may also cause the headset printed circuit board 340 to transmit a second electrical charge of a preset duration, magnitude, or polarity to the TEG array situated beneath one of the headset haptic thermal regions (e.g., 461, or 462) and identified by the headset controller based on the received haptic thermal command. The method for initiating haptic movement or thermal feedback across a plurality of peripheral devices based on identified occurrence of a gaming action event within live gameplay may then end.

Figure 10:
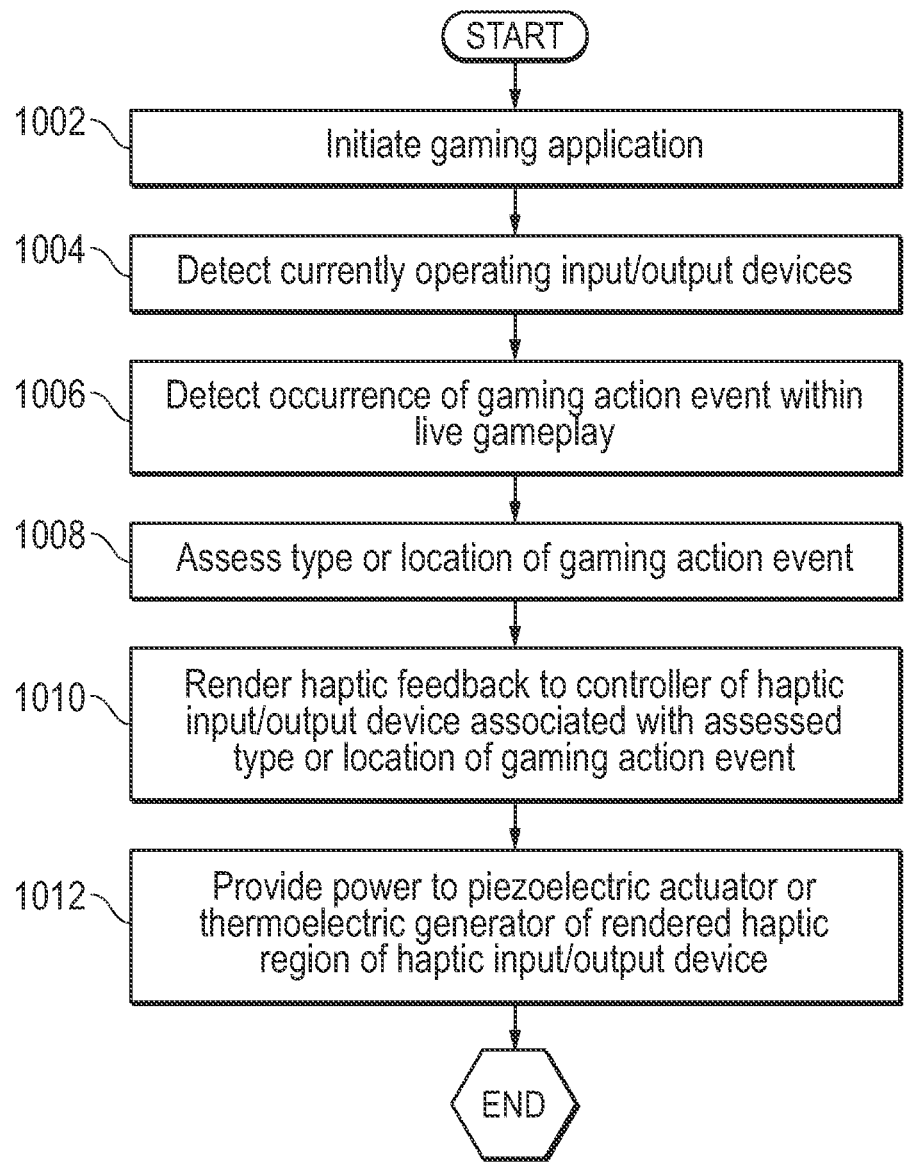
FIG. 10 is a flow diagram illustrating another method of rendering haptic feedback across a plurality of haptic zones of input/output devices according to an embodiment of the present disclosure.

FIG. 10 is a flow diagram illustrating a method of rendering haptic feedback across a plurality haptic zones at one or more input/output devices based on detected gaming action event types or locations according to an embodiment of the present disclosure. As described herein, a haptic peripheral device ecosystem coordination system for an information handling system in an embodiment may include a processor identifying a gaming action event and determining a position of the action event relative to a player avatar image within the 3D gaming environment for an action event indicator. The haptic peripheral device ecosystem coordination system may also transmit a haptic command, selected from a plurality of haptic commands based on the type or position of the action event indicator, to a controller for a triggered haptic peripheral device. The controller for the triggered haptic peripheral device in such an embodiment may execute the received haptic command to cause haptic feedback within a haptic region of the triggered haptic peripheral device that is correlated to the position or type of the action event.

At block 1002, the user may initiate the gaming application. For example, in an embodiment described with reference to FIG. 6, the user may initiate the gaming software application 620. As another example, described with reference to FIG. 5, the gaming software application may then generate live gameplay displayed within the three-dimensional virtual gaming environment 500. In yet another example, in an embodiment described with reference to FIG. 7, the video display 710 may display the three-dimensional virtual gaming environment generated by the gaming application during live gameplay, while the user provides input via one or more input/output devices (e.g., 740, 750, or 760).

The haptic peripheral device ecosystem coordination system in an embodiment may detect currently operating input/output devices at block 1004. For example, the haptic peripheral device ecosystem coordination system in an embodiment described with reference to FIG. 7 may detect that one or more of the input/output devices (e.g., haptic keyboard or haptic keyboard palmrest assembly 740, haptic mouse 750, or haptic headset 760) are currently in use by the user. Gaming application settings may also be used to determine which input/output devices are used such as settings determining which haptic keys 747 or 748 are designated for gaming actions or whether the haptic mouse 751 or haptic headset 760 is engaged. The use of the haptic keyboard keys such as 747 may further indicate that haptic zone 745 of the haptic keyboard palmrest may be utilized by a user's left hand. Similarly, use of the haptic keyboard keys such as 748 may further indicate that haptic zone 746 of the haptic keyboard palmrest may be utilized by a user's right hand. Use of the mouse 750, may indicate that one of the sides of haptic keyboard and palmrest assembly 740 may not be used.

At block 1006, the haptic peripheral device ecosystem coordination system or the gaming application itself in an embodiment may detect occurrence of a gaming action event within live gameplay. For example, the haptic peripheral device ecosystem coordination system may detect a visual action identifier using the methods described with reference to FIG. 8. As another example, the haptic peripheral device ecosystem coordination system may detect an audio action identifier using the methods described with reference to FIG. 9. In some embodiments, the gaming application code itself may transmit identification of the audio or visual action identifier for a gaming action event to the haptic peripheral device ecosystem coordination system during ongoing gameplay. Such instructions, or some portion of instructions, for gaming action events or environment may be coded into the gaming application in some embodiments.

The haptic peripheral device ecosystem coordination system in such embodiments may identify a gaming action event associated with one or both of these visual or audio action event identifiers (e.g., by referencing TABLE 1). In some embodiments, such an identification may also take into account input received from one or more input/output devices as described at blocks 910-914 of FIG. 9. In still other embodiments, the gaming application itself may identify occurrence of a gaming action event and transmit an indication that the identified gaming action event has occurred to the haptic peripheral device ecosystem coordination system.

The haptic peripheral device ecosystem coordination system or the gaming application in an embodiment may assess the type or location of the gaming action event at block 1008. For example, in an embodiment described with respect to FIG. 7, the haptic peripheral device ecosystem coordination system may assess the location of the action event 711, within the lower right quadrant of the three-dimensional gaming environment when the player avatar fires its weapon. The haptic peripheral device ecosystem coordination system may detect the type of action event 711 to be the player avatar firing its weapon in such an embodiment, and may detect the position of the action event 711 to be occurring close to or at the player avatar.

At block 1010, the haptic peripheral device ecosystem coordination system in an embodiment may render haptic feedback to the controller of the haptic input/output device associated with the assessed type or location of the gaming action event. For example, the haptic peripheral device ecosystem coordination system renders a detected gaming action event by type or location and may transmit to the thermo-haptic mouse 750 a haptic movement command for executing a single, short pulse of movement at haptic region 751 and at a low intensity, and a haptic thermal command for executing a short thermal increase of low intensity at the haptic region 751, based on a determination that the gaming action event is the player avatar has fired a single shot. As another example, the haptic peripheral device ecosystem coordination system may transmit to the thermo-haptic mouse 750 a haptic movement command for executing multiple short pulses of movement of low intensity at a haptic region 751, and a haptic thermal command for executing a long thermal increase of low intensity at the haptic region 751, based on a determination that the gaming action event is the player avatar is continuously shooting.

Such haptic movement commands and haptic thermal commands may be executed at more than one of the thermo-haptic input/output peripheral devices (e.g., 740, 750, 760) in an embodiment. The haptic peripheral device ecosystem coordination system coordinates the haptic feedback by determining which input/output devices are active and rendering the haptic feedback to haptic regions (e.g., 745, 746, 747, 748, 751, 761, or 762) to create a three-dimensional haptic experience among the input/output devices. For example, the haptic peripheral device ecosystem coordination system may transmit to the thermo-haptic headset 760 a haptic movement command for executing three sets of short movement pulses of high intensity in one or more of haptic regions 761 or 762, and a haptic thermal command for executing a short thermal decrease of high intensity at the thermo-haptic headset 760, based on a determination that enemy avatar has taken damage. As another example, the haptic peripheral device ecosystem coordination system may transmit to the thermo-haptic keyboard and palm rest assembly 740 a haptic movement command for executing a single, long pulse of movement of high intensity at one or more of the haptic regions 745 or 746, and a haptic thermal command for executing a long thermal increase of high intensity at one or more of the haptic regions 745 or 746, or at one or more of the haptic keys 747 or 748, based on a determination that an explosion has occurred nearby the player avatar.

The haptic feedback associated with an identified gaming action event in an embodiment may initiate haptic movement or thermo-haptic feedback of a portion of an input/output device (e.g., 740, 750, or 760) having a position with respect to the user that correlates to the position of the gaming action event (e.g., 711, 722, 742) with respect to the player's avatar within the virtual three-dimensional gaming environment. For example, the gaming action event 711, located in the bottom-right corner of the image of the virtual three-dimensional gaming environment and indicating an event occurring very near or at the player's avatar 710 may be associated with a haptic movement or thermo-haptic feedback within a haptic region toward the right of one or more input/output devices situated closest the user. In one such example embodiment, the gaming action event 711 may be associated with haptic movement or thermo-haptic feedback at the right side haptic region 746 of the haptic keyboard palm rest, or at the haptic region 751 of the haptic mouse 750. As another example, the gaming action event 742, located in the top-center of the image of the virtual three-dimensional gaming environment and indicating an event occurring relatively farther away from the player's avatar 710 may be associated with a haptic movement or thermo-haptic feedback of one or more keys (e.g., 747 or 748) of a keyboard, or regions 761 or 762 of the haptic headset.

In some embodiments, the detected gaming action event may be associated with a plurality of haptic regions. For example, the ally attack gaming action event 742 in an embodiment may begin at the ally avatar 741, and move toward the enemy avatar 743. In such an example embodiment, the gaming action event 742 may be associated with a haptic movement or thermo-haptic feedback that begins in a haptic region located to the left of an input/output device, and proceeds across a plurality of haptic regions in a straight line to the right side of the input/output device. For example, the haptic movement or thermo-haptic feedback associated with gaming action event 742 may render at key 747, then proceed across the keyboard 740 to key 748. As another example, the haptic movement or thermo-haptic feedback associated with gaming action event 742 may render at the left-side haptic region 762 of the headset 760, then proceed over to the right-side haptic region 761 of the haptic headset 760. In such a way, the haptic peripheral device ecosystem coordination system may cause haptic feedback in one or more locations across a plurality of input/output devices (e.g., 740, 750, 760) that reflects the location of the gaming action event (e.g., 711 or 742) within the virtual three-dimensional gaming environment.

The controller for the haptic input/output device in an embodiment may provide power to a piezoelectric actuator or thermoelectric generator of the rendered haptic region of the haptic input/output device at block 1012. For example, in an embodiment described with reference to FIG. 1, the haptic peripheral device ecosystem coordination system 132 may transmit an instruction to the peripheral device driver 114 via bus 108 to initiate a specific thermo-haptic feedback, or haptic movement at one or more thermo-haptic input/output peripheral devices 112 (e.g., haptic mouse 750, haptic keyboard keys 747 or 748, haptic keyboard palm rest haptic zones 745 or 746, haptic headset 760). Any array of haptic zones in the input/output peripheral devices 112 is contemplated according to various embodiments herein. The peripheral device driver 114 for one or more of these thermo-haptic input/output peripheral devices 112 in an embodiment may transmit an instruction to a controller 141 for the triggered input/output device 112 to render the thermo-haptic feedback by supplying power to one or more TEG arrays (e.g., 170-1, 170-2, 170-*n*), or to render the haptic movement by supplying power to one or more PEAs (e.g., 130-1, 130-2, 130-*n*).

In an embodiment described with reference to FIG. 2, the keyboard controller may provide power to the piezoelectric actuator 234, via the keyboard main printed circuit board 240, to cause haptic movement 203 within the haptic region 251*a* of the keyboard palm rest 250. As another example, the keyboard controller may provide power to the TEG array 271-1, via the keyboard main printed circuit board 240, to cause thermo-haptic feedback within the haptic region 251*a* of the keyboard palm rest 250. Similarly, a piezoelectric actuator and TEG array may be mounted under the keycap of the keyboard 200 keys in FIG. 2 to provide haptic regions at the keys being used during gaming. In another example embodiment described with reference to FIG. 3, the mouse controller may provide power to the piezoelectric actuator 330-1, via the mouse printed circuit board 340, to cause haptic movement within the haptic region 371 of the haptic mouse 350. As another example, the mouse controller may provide power to the TEG array 370-1, via the mouse printed circuit board 340, to cause thermo-haptic feedback within the haptic region 371 of the haptic mouse 350. In still another embodiment, the haptic headset controller may provide power to a piezoelectric actuator or TEG array to cause haptic movement or thermo-haptic feedback within the haptic region 461 of the haptic headset 460. The method may then end.

The blocks of the flow diagrams of FIGS. 8, 9, and 10, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A haptic peripheral input/output device ecosystem coordination system for an information handling system, comprising:
   a display device displaying a three-dimensional (3D) gaming environment;
   a processor identifying a gaming action event occurring in the 3D gaming environment, and determining a position of the action event relative to a player avatar image within the 3D gaming environment for an action event indicator;
   the processor transmitting a haptic command to a controller for a triggered haptic peripheral input/output device, the haptic command selected from a plurality of haptic commands based on the action event indicator;

the triggered haptic peripheral input/output device selected from a plurality of peripheral input/output devices within a haptic peripheral input/output device ecosystem based on the position of the action event relative to the player avatar image within the 3D gaming environment relative to a known position of a haptic zone on the triggered haptic peripheral input/output device within the haptic peripheral input/output device ecosystem; and the controller for the triggered haptic peripheral input/output device executing the received haptic command to cause haptic feedback within a haptic region of the triggered haptic peripheral device at a position relative to the user that is correlated to the position of the action event with respect to the player avatar image.

2. The information handling system of claim 1, wherein the triggered haptic peripheral input/output device is a keyboard palm rest.

3. The information handling system of claim 1, wherein the triggered haptic peripheral input/output device is a mouse.

4. The information handling system of claim 1, wherein the triggered haptic peripheral input/output device is an audio headset device.

5. The information handling system of claim 1, wherein the haptic feedback is haptic movement caused by the controller applying voltage across a piezoelectric actuator within the triggered haptic peripheral input/output device, pursuant to execution of the haptic command.

6. The information handling system of claim 1, wherein the haptic feedback is haptic thermal change caused by the controller applying voltage to a thermoelectric generator (TEG) within the triggered haptic peripheral input/output device, pursuant to execution of the haptic command.

7. The information handling system of claim 1 further comprising:
the processor identifying the gaming action event, based on a combination of a detected visual action event indicator and a detected audio action event indicator.

8. A method of coordinating haptic feedback across a peripheral input/output device ecosystem, comprising:
displaying a three-dimensional (3D) gaming environment, via a display device;
identifying a gaming action event occurring in the 3D gaming environment, via a processor, to generate a detected action event indicator;
determining a position and type of the gaming action event within the 3D gaming environment;
transmitting a haptic command, selected from a plurality of haptic commands, based on an identification of the gaming action event, to a controller for a triggered haptic peripheral input/output device selected from a plurality of peripheral input/output devices within a haptic peripheral input/output device ecosystem, based on the position and type of the gaming action event within the 3D gaming environment relative to a known position of a haptic zone of the triggered haptic peripheral input/output device within the haptic peripheral input/output device ecosystem; and
executing the received haptic command, via the controller for the triggered haptic peripheral input/output device, to cause haptic feedback within the haptic zone of the triggered haptic peripheral input/output device that is correlated to the type of the gaming action event.

9. The method of claim 8 further comprising:
executing the received haptic command to cause a haptic thermal decrease in temperature within the haptic zone by applying voltage to a thermoelectric generator within the triggered haptic peripheral input/output device.

10. The method of claim 8 further comprising:
executing the received haptic command to cause a haptic thermal increase in temperature within the haptic zone by applying voltage to a thermoelectric generator within the triggered haptic peripheral input/output device.

11. The method of claim 8 further comprising:
identifying the gaming action event, via the processor, based on action event indicators received from the gaming application code to generate the haptic command.

12. The method of claim 8 further comprising:
identifying the gaming action event, via the processor, based on a combination of a detected visual action event indicator and the position of the gaming action event relative to the player avatar image within the 3D gaming environment.

13. The method of claim 8 further comprising:
executing code instructions of a trained image recognition model, via the processor, to identify the gaming action event and a movement of the gaming action event within the 3D gaming environment within a captured image of live gameplay as displayed via the display device; and
generating a moving haptic response across a plurality of haptic zones of the triggered haptic peripheral input/output device, corresponding to the movement of the gaming action event.

14. The method of claim 8 further comprising:
executing code instructions of a trained image recognition model, via the processor, to identify the gaming action event and a movement of the gaming action event within the 3D gaming environment within a captured image of live gameplay as displayed via the display device; and
generating a moving haptic response across the plurality of peripheral input/output devices within the haptic peripheral device ecosystem, corresponding to the movement of the gaming action event.

15. The method of claim 8 further comprising:
receiving from firmware for the display device a measured magnitude and speed of change in pixel brightness for an identified region of pixels of the display device;
identifying, via the processor, the gaming action event and a movement of the gaming action event within the 3D gaming environment based on the measured magnitude and speed of change in pixel brightness and the identified region of pixels; and
generating a moving haptic response across a plurality of haptic regions of the triggered haptic peripheral input/output device, corresponding to the movement of the gaming action event.

16. A haptic peripheral device ecosystem coordination system for an information handling system, comprising:
a display device displaying a three-dimensional (3D) gaming environment;
a processor identifying a gaming action event occurring in the 3D gaming environment, and determining a position and type of the gaming action event within the 3D gaming environment to generate a detected action event indicator;

the processor transmitting a haptic thermal command and a haptic movement command to one or more controllers for a triggered haptic peripheral input/output device;

the triggered haptic peripheral device selected from a plurality of peripheral input/output devices within a haptic peripheral input/output device ecosystem based on the position and type of the gaming action event within the 3D gaming environment relative to a known position of a haptic zone of the triggered haptic peripheral input/output device within the haptic peripheral input/output device ecosystem;

the one or more controllers for the triggered haptic peripheral input/output device executing the received haptic movement command to cause haptic movement within the haptic zone of the triggered haptic peripheral input/output device and executing the haptic thermal command to cause haptic thermal change within the haptic zone; and the haptic zone at a position relative to the user that is correlated to the position and type of the gaming action event.

17. The information handling system of claim 16, wherein the one or more controllers apply pulses of voltage across a piezoelectric actuator within the triggered haptic peripheral input/output device to cause the haptic movement, pursuant to execution of the haptic movement command.

18. The information handling system of claim 16, wherein the haptic movement command identifies a magnitude of voltage applied by the one or more controllers across a piezoelectric actuator within the triggered haptic peripheral input/output device to cause the haptic movement at one of a plurality of preset intensity levels.

19. The information handling system of claim 16, wherein the haptic movement command identifies a time duration for application of voltage by the one or more controllers across a piezoelectric actuator within the triggered haptic peripheral input/output device to cause the haptic movement for one of a plurality of preset time durations.

20. The information handling system of claim 16, wherein the haptic thermal command identifies a time duration for application of voltage by the one or more controllers to the TEG within the triggered haptic peripheral input/output device to cause the haptic thermal change for one of a plurality of preset time durations.

* * * * *